(12) United States Patent
Greco et al.

(10) Patent No.: US 6,447,595 B1
(45) Date of Patent: Sep. 10, 2002

(54) SYSTEMS AND METHODS FOR PRODUCING AND USING FINE PARTICLE MATERIALS

(75) Inventors: Guido Greco, Northport; Vincent Pernice, Woodbury, both of NY (US); Barry E. Scheetz, Lemont, PA (US)

(73) Assignee: Ameritech Holdings Corporation, Ronkonkoma, NY (US)

(*) Notice: Subject to any disclaimer, the term of this patent is extended or adjusted under 35 U.S.C. 154(b) by 0 days.

(21) Appl. No.: 09/607,447

(22) Filed: Jun. 30, 2000

Related U.S. Application Data

(60) Provisional application No. 60/142,087, filed on Jul. 2, 1999.

(51) Int. Cl.$^7$ .......................... C03C 8/14; C03C 12/00; C03C 12/02; C04B 14/22

(52) U.S. Cl. ................. 106/487; 106/484; 106/415; 106/417; 106/400; 106/401; 106/403; 106/405; 106/464; 106/472; 501/17; 501/18; 501/19

(58) Field of Search .................. 241/24.27, 24.3, 241/24.31, 24.25, 24.1; 106/400, 401, 403, 405, 464, 472, 484, 489, 415, 417; 501/17, 18, 19

(56) References Cited

U.S. PATENT DOCUMENTS

| | | |
|---|---|---|
| 1,876,416 A | 9/1932 | Hill |
| 2,700,511 A | 1/1955 | Denovan et al. ............. 241/154 |
| 2,963,378 A | 12/1960 | Palmquist et al. ........... 106/193 |
| 3,251,704 A | 5/1966 | Nellessen ................... 106/193 |
| 3,331,699 A | 7/1967 | Marshall et al. ............. 106/291 |
| 3,480,577 A | 11/1969 | Hallstrom et al. ............ 260/23 |
| 3,630,764 A | 12/1971 | Shannon ....................... 106/15 |
| 3,843,571 A | 10/1974 | Fitzgerald ................ 260/17 R |
| 3,941,584 A * | 3/1976 | Tundermann et al. ...... 106/403 |
| 3,969,128 A * | 7/1976 | Urs ............................ 106/291 |
| 4,087,052 A | 5/1978 | Rohrbach ..................... 241/65 |
| 4,097,287 A | 6/1978 | Ito et al. ................... 106/14.14 |
| 4,156,046 A | 5/1979 | Lien et al. ................... 428/220 |
| 4,218,505 A | 8/1980 | Shiga et al. ................. 428/306 |
| 4,240,590 A | 12/1980 | Lautenschläger et al. ..... 241/56 |
| 4,263,345 A | 4/1981 | Bingham .................... 427/163 |

(List continued on next page.)

FOREIGN PATENT DOCUMENTS

| | | |
|---|---|---|
| DE | 3113136 | 3/1982 |
| JP | 115237 | 2/1983 |
| WO | WO 94/18136 A1 | 8/1994 |
| WO | WO 94/18136 * | 8/1994 |
| WO | WO 98/28370 A1 | 7/1998 |

OTHER PUBLICATIONS

JP–03242656A (Katsushi, Inoue) Jan. 27, 1992 (abstract). [online] [Retrieved on Jan. 26, 2001]. Retrieved from Patent Abstracts of Japan.

CN 1 064 286A (Cao, Changjiang) Sep. 9, 1992 (abstract). [online] [Retrieved on Jan. 26, 2001]. Retrieved from: Database EPODOC Online!.

(List continued on next page.)

*Primary Examiner*—C. Melissa Koslow
(74) *Attorney, Agent, or Firm*—Fish & Neave; John M. Hintz; Dutch D. Chung

(57) ABSTRACT

Systems and methods of making and using fine particle materials in pigment blends and for using the aforementioned pigment blends in paint, coating, or coloring compositions are provided. This invention further provides systems and methods of enhancing the visual appearance of a variety of substrates by introducing a paint, coating, or coloring composition to the substrate. The fine particle materials of the present invention have a substantially random geometric shape, a particle size less than about 100 microns, and help provide both functional and visual enhancing properties to compositions and substrates containing these fine particle materials.

10 Claims, 20 Drawing Sheets

U.S. PATENT DOCUMENTS

| | | | | |
|---|---|---|---|---|
| 4,346,184 A | | 8/1982 | Drake | 523/451 |
| 4,353,991 A | * | 10/1982 | Van Ness et al. | 501/20 |
| 4,420,501 A | | 12/1983 | Ueda et al. | 427/54.1 |
| 4,436,845 A | | 3/1984 | Kitano | 523/172 |
| 4,493,459 A | | 1/1985 | Burkett | 241/152 A |
| 4,518,429 A | | 5/1985 | Drake et al. | 106/14.39 |
| 4,539,258 A | | 9/1985 | Panush | 428/324 |
| 4,561,896 A | | 12/1985 | Drake et al. | 106/14.12 |
| 4,598,015 A | | 7/1986 | Panush | 428/324 |
| 4,598,020 A | | 7/1986 | Panush | 428/411.1 |
| 4,605,687 A | | 8/1986 | Panush | 523/171 |
| 4,615,940 A | | 10/1986 | Panush et al. | 428/324 |
| 4,623,390 A | | 11/1986 | Delmonico | 106/15.05 |
| 4,711,803 A | | 12/1987 | Kuo | 428/209 |
| 4,720,518 A | | 1/1988 | Chihara et al. | 524/267 |
| 4,792,536 A | * | 12/1988 | Pecoraro et al. | 501/70 |
| 4,886,216 A | | 12/1989 | Goble | 241/152 R |
| 4,898,618 A | | 2/1990 | Holcombe, Jr. et al. | 106/287.34 |
| 4,983,458 A | | 1/1991 | Dejaiffe | 428/402 |
| 5,000,937 A | | 3/1991 | Grollier et al. | 424/47 |
| 5,066,330 A | | 11/1991 | Holcombe, Jr. et al. | 106/287.34 |
| 5,080,718 A | * | 1/1992 | Sullivan et al. | 106/453 |
| 5,087,518 A | | 2/1992 | Shimada et al. | 428/372 |
| 5,188,302 A | | 2/1993 | Alvarez | 241/189.1 |
| 5,205,837 A | | 4/1993 | Andrean et al. | 8/405 |
| 5,223,250 A | | 6/1993 | Mitchell et al. | 424/59 |
| 5,319,001 A | | 6/1994 | Morgan et al. | 523/205 |
| 5,364,672 A | * | 11/1994 | Schultze-Kraft | 428/15 |
| 5,366,763 A | | 11/1994 | McDaniel | 427/193 |
| 5,368,885 A | | 11/1994 | Fotiou | 427/195 |
| 5,393,714 A | * | 2/1995 | Thometzek et al. | 501/29 |
| 5,470,893 A | | 11/1995 | Sinclair-Day et al. | 523/205 |
| 5,482,217 A | * | 1/1996 | Schonert et al. | 241/24 |
| 5,484,109 A | | 1/1996 | Cook | 241/73 |
| 5,518,535 A | | 5/1996 | Boaz | 106/38.3 |
| 5,520,956 A | | 5/1996 | Kieser et al. | 427/203 |
| 5,531,985 A | | 7/1996 | Mitchell et al. | 424/59 |
| 5,620,775 A | | 4/1997 | LaPerre | 428/149 |
| 5,677,064 A | | 10/1997 | Boaz | 428/426 |
| 5,698,026 A | | 12/1997 | Boaz | 106/600 |
| 5,702,520 A | * | 12/1997 | Boaz | 106/600 |
| 5,746,961 A | | 5/1998 | Stevenson et al. | 264/255 |
| 5,753,325 A | | 5/1998 | McDaniel | 428/34.7 |
| 5,758,832 A | | 6/1998 | Grainger | 241/19 |
| 5,772,126 A | | 6/1998 | Hanvey, Jr. et al. | 241/19 |
| 5,775,604 A | | 7/1998 | Satō | 241/24.22 |
| 5,814,686 A | | 9/1998 | Micale et al. | 523/205 |
| 5,820,044 A | | 10/1998 | Greco | 241/154 |
| 5,830,567 A | * | 11/1998 | Panush | 428/324 |
| 5,856,378 A | | 1/1999 | Ring et al. | 523/205 |
| 5,887,804 A | | 3/1999 | Hansen | 241/24.3 |
| 6,073,866 A | | 6/2000 | Silver et al. | 241/19 |
| 6,242,056 B1 | * | 1/2001 | Spenscer et al. | 427/512 |

OTHER PUBLICATIONS

JP–06191838A (Hattori, Toshio) Oct. 17, 1994 (abstract). [online] [Retrieved on Jan. 26, 2001]. Retrieved from:Patent Abstracts of Japan.

CN 1 110 699A (Mei, Z) Oct. 25, 1995 (abstract). [online] [Retrieved on Jan. 26, 2001]. Retrieved from: Database WPI.

Beckerman, Susan "Using Hollow Glass Spheres in Paint and Coatings", *PCI Paint & Coatings Industry*, vol. XIV, No. 8 (Aug. 1998), pp. 92–94.

Mark Drukenbrod, Glass Microsphere Use in Modern Coating Products [online], [retrieved on Jun. 23, 1999]. Retrieved from the Internet <http://news.paintandcoatings.com/feature–articles/19990127–2950.html>.

* cited by examiner

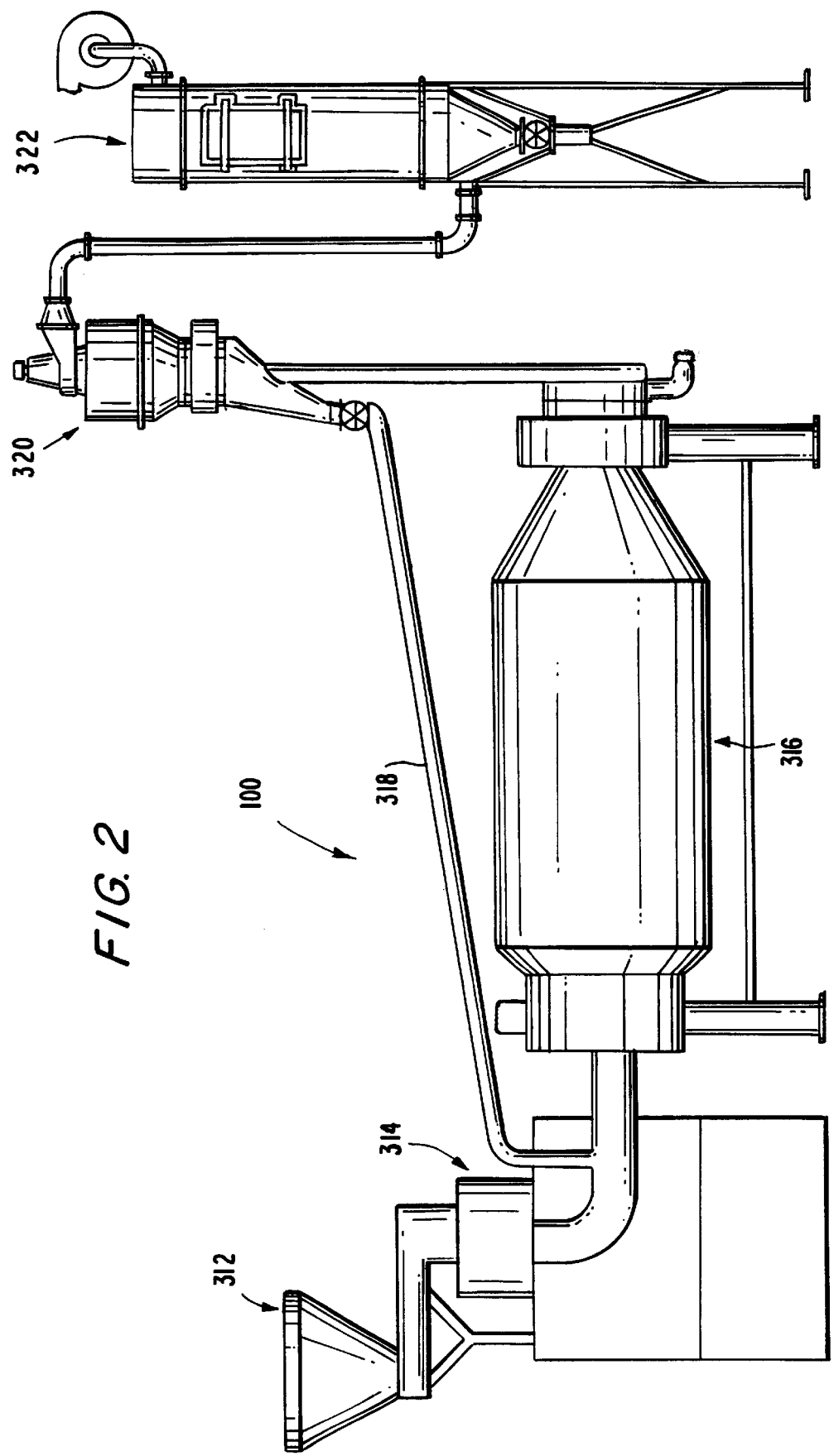

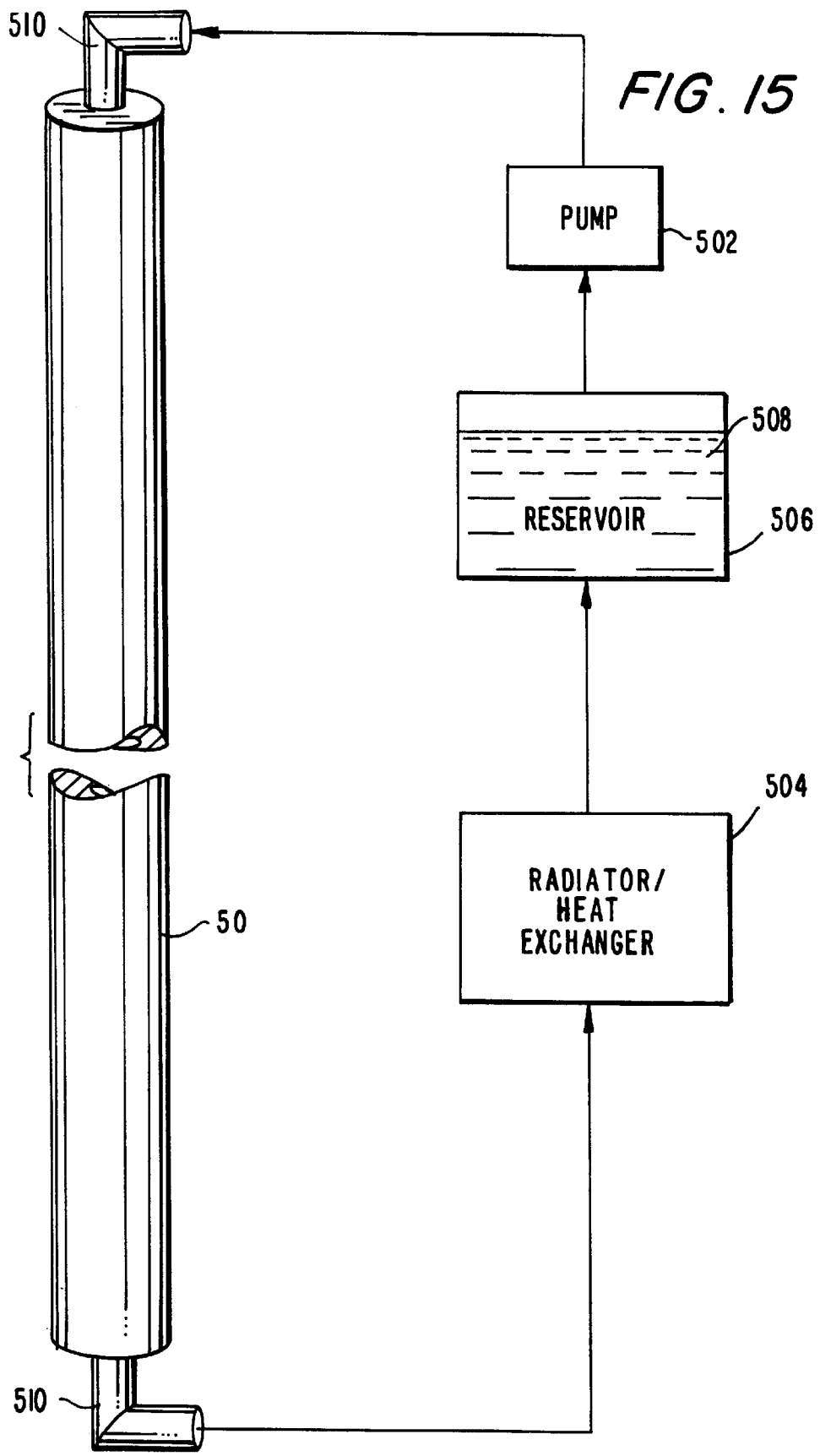

MIRROR

MIRROR

MIRROR

MIRROR

of the raw material into pieces suitable for efficient pulverizing. Once the raw material has been separated, crushed, and cleaned, it is conveyed to a first feed hopper that then feeds the raw material to a first pulverizer. The pulverized particles made by pulverizing the raw material may then be sent to a screen classifier to remove any remaining impurities, such as particle metal waste resulting from wear and tear of the innards of the pulverizer, if necessary. Next, the pulverized particle material is classified according to size. Pulverized particle materials that do not meet the desired size limitation may be sent to be either pulverized again or milled to further reduce the particle material to a size suitable for the desired application. Alternatively, the pulverized material produced by the first pulverizer may be sent immediately to a ball mill to help reduce the particle material to a desired particle size.

SYSTEMS AND METHODS FOR PRODUCING AND USING FINE PARTICLE MATERIALS

CROSS REFERENCE TO RELATED APPLICATION

This application claims the benefit of U.S. provisional patent application No. 60/142,087, filed Jul. 2, 1999.

BACKGROUND OF THE INVENTION

The present invention relates to systems and methods for producing and using fine particle materials. More particularly, the present invention relates to systems and methods for taking raw materials, pulverizing those raw materials, and incorporating the pulverized materials into products to enhance the visual appearance of the products.

In numerous commercial products, pigment blends are used to create color and visual effects that aesthetically appeal to consumers. Because different consumers have different preferences to various visual effects, a designer's ability to create and control these effects is often important to the marketability of a product. Often, additives such as coated mica flakes, metal flakes, and glass flakes have been used in pigment blends to enhance the visual appeal of items such as automobiles, boats, planes, appliances, signs, painted surfaces, fabrics, and other consumer goods.

Depending on the nature of the substrate to which the pigment blend is introduced, there are certain visual effects that often have strong aesthetic appeal to consumers. Coated mica flakes, for example, is one of the more common additives used to improve luster and depth of color of paint compositions on cars. Metal flakes, such as aluminum flakes, are another common additive used to improve the sparkle of paint and coatings.

While the aforementioned additives offer some of the visual effects that typically appeal to consumers, a need remains for an economical pigment blend that enables a designer to create and control a broader range of visual effects. Moreover, a need always exists for improved ways to enhance the functional properties of paint and coating compositions, such as increased durability, increased travel, improved pattern control, UV screening, and reduced settling problems from particulates in unapplied paint or coatings.

SUMMARY OF THE INVENTION

These and other needs are satisfied in accordance with the present invention by providing systems and methods for making and using fine particle materials in pigment blends and for using the aforementioned pigment blends in paint, coating, or coloring compositions. The invention further provides systems and methods for enhancing the visual appearance of a variety of substrates by introducing such a paint, coating, or coloring composition to the substrate. The fine particle materials of the present invention have a substantially random geometric shape, a particle size less than about 100 microns, and help provide both functional and visual enhancing properties to compositions and substrates containing these fine particle materials.

The fine particle materials of the present invention may be made generally from any pulverizable material. Initially, solid raw pulverizable material may be sorted according to type and subsequently cleaned of any impurities. Depending on the original size of the solid raw material, it may be sent, either before or after cleaning, to a crusher to reduce the size The fine particle materials of the present invention may be used in pigment blends to enhance the visual and functional properties of a substrate. One or more coloring agents may be optionally added to the pigment to assist with enhancing the visual appearance of the substrate to be treated. The visual appearance of the substrate may be enhanced by introducing a coating, coloring, or paint composition containing the pigment blend with the fine particle material to the substrate by either applying the composition to the surface of the substrate or by incorporating the composition into the substrate itself.

BRIEF DESCRIPTION OF THE DRAWINGS

Further features of the invention, its nature and various advantages will be more apparent from the following detailed description of the preferred embodiments, taken in conjunction with the accompanying drawing, in which like reference characters refer to like parts throughout, and in which:

FIG. 2 illustrates an alternative embodiment of a system for producing fine particle materials that uses a ball mill in conjunction with a pulverizer in accordance with the present invention.

FIG. 15 illustrates a schematic for additionally or alternatively cooling the shaft of the pulverizer of FIG. 3 to prevent expansion of the shaft.

DETAILED DESCRIPTION OF THE PREFERRED EMBODIMENT

Figure 1A:
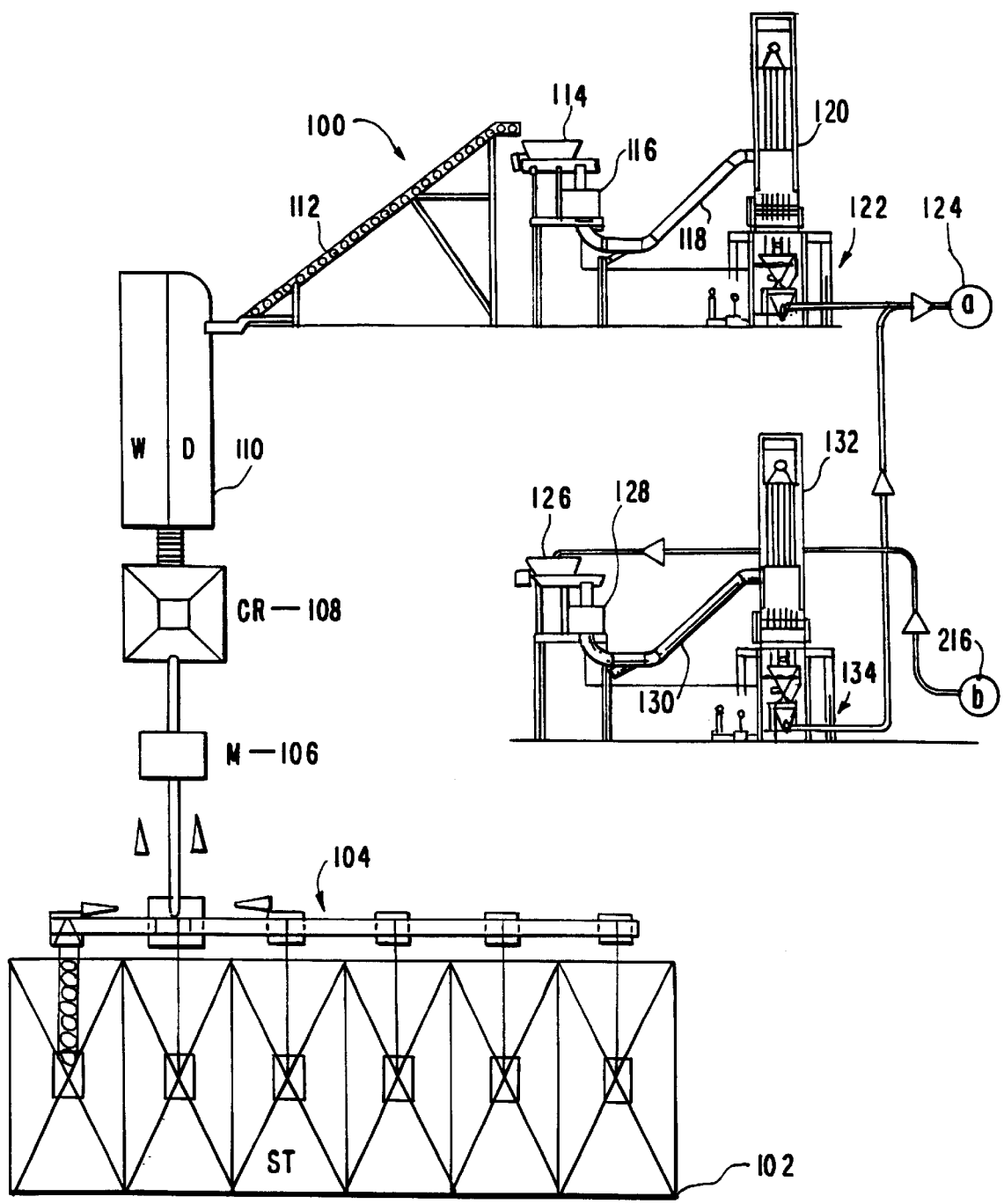
FIGS. 1A–1C illustrate one embodiment of a system for producing fine particle materials in accordance with the present invention.
Figure 1B:
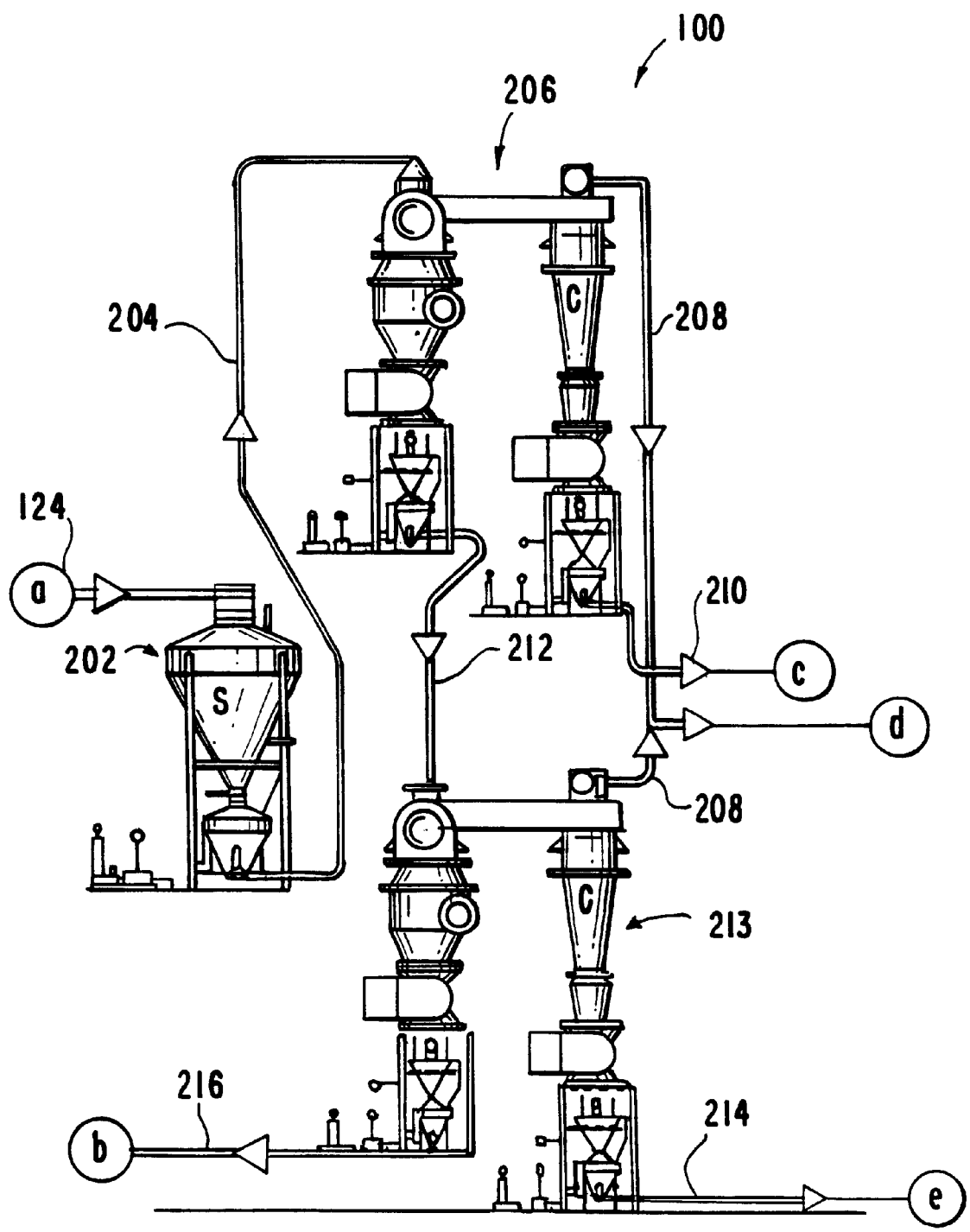
Figure 1C:
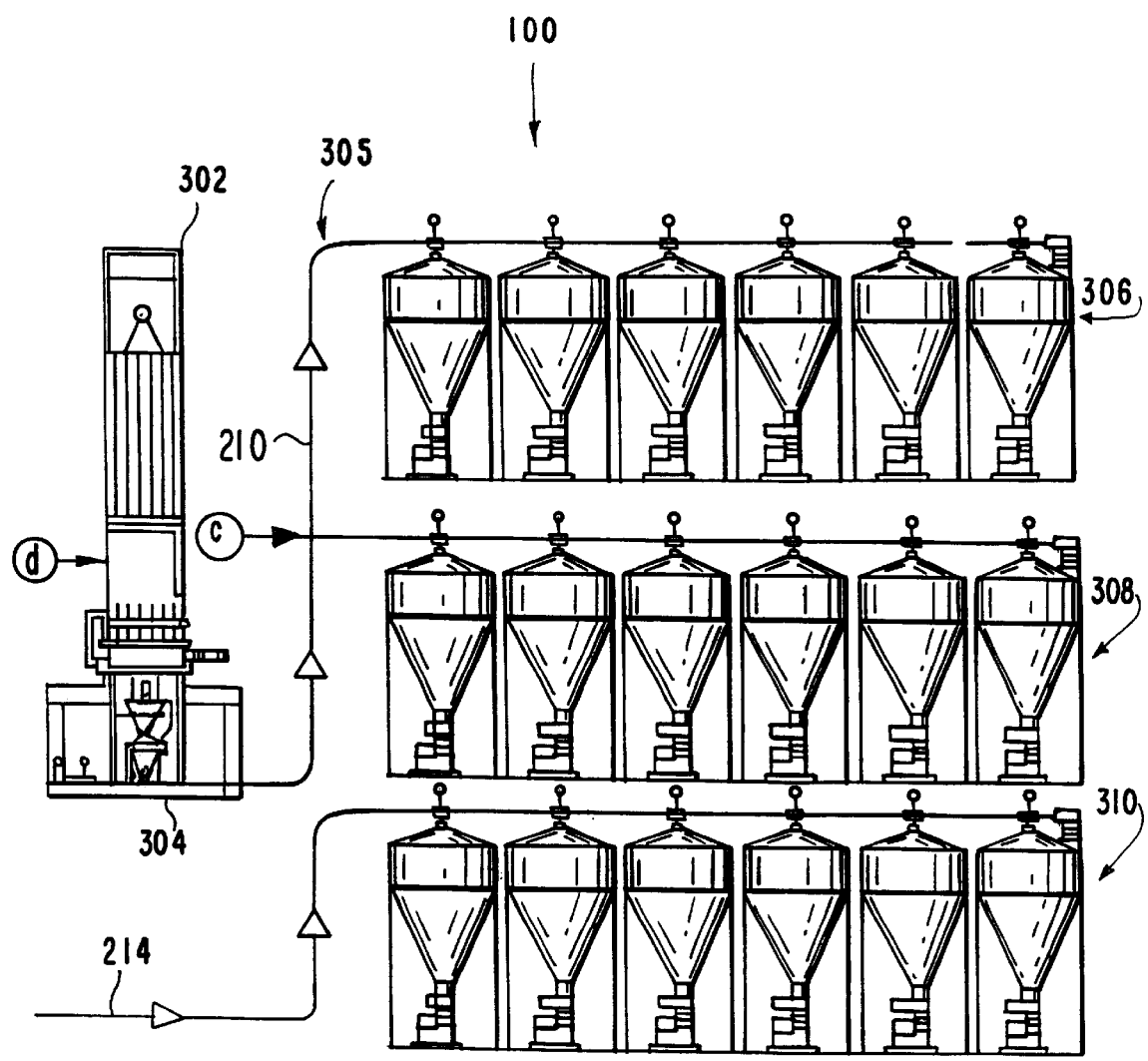

Turning to FIGS. 1A–1C, one embodiment of a system 100 for producing fine particle materials in accordance with the present invention is shown. As illustrated, system 100 is directed toward the production of fine particle glass. However, it should be noted that with minor modification, system 100 could be used to produce other types of fine particle materials, including rubber, oyster shell, rock minerals, coal, aluminum, and other similar crushable materials.

Initially raw material glass is stored in storage bins 102. As illustrated in FIG. 1A, system 100 may contain six storage bins 102 or any suitable number of storage bins 102. Within storage bins 102, the raw material glass may be sorted by type. For example, the raw material glass may be separated by type and color so that clear glass, green glass, amber glass, aluminum-coated mirror, gold-coated mirror, and mixed glass are each stored in a different one of storage bins 102. Most commonly the mirrors will be silver-copper coated with a paint backing. In addition to using mirrors with different types of backing, mirrors of varying thickness may also be employed. For example, other raw material products, such as one-quarter inch or one-half inch mirror may also be used. The one-quarter inch and one-half inch mirrors may be mixed together or treated separately to yield fine glass particles. Depending on the application and visual effect sought, one or more classes of mirrors may be combined to yield a combination of fine particle materials that provide sought after visual enhancing properties.

Using conveyer 104, glass may be removed from any one or more of storage bins 102 and transported to magnetic separator 106. Magnetic separator 106 may be used to remove any metal waste that may be mixed in with the raw glass. Conveyer 104 then carries the glass to crusher 108. Crusher 108 is used to crush the raw material glass down into a size suitable for further processing. The crushed glass is then conveyed to washer/dryer 110. In washer/dryer 110, the crushed glass is then removed of paper, glue, and any other impurities that may be present in the crushed glass. In an alternative embodiment, the glass may be first cleaned by washer/dryer 110 before it is crushed by crusher 108. Alternatively, as part of the cleaning process, the combustible impurities that may accompany the glass (e.g., labels from recycled glass) may be burned off of the raw glass material either before or after the glass is crushed by crusher 108.

Once the glass has been crushed, washed and dried, the glass is then conveyed by conveyer 112 to a first feed hopper 114. First feed hopper 114 then feeds the crushed and cleaned glass to a first pulverizer 116 by way of a screw conveyer. First pulverizer 116 performs an initial pass on the crushed glass and provides first-stage pulverized glass through pipe 118 to dust collector 120. Dust collector 120 releases air pressure from the output of first pulverizer 116. Attached to dust collector 120 is a material transport system 122 that restabilizes the air pressure in the output of dust collector 120 and then drives the first-stage pulverized glass through pipe 124 to screen classifier 202 as shown in FIG. 1B.

Once the screen classifier 202 receives the pulverized glass, it removes any remaining impurities, including any particle metal waste resulting from wear and tear of the innards of pulverizer 116 or 128. In some cases, the screen classifier may not be needed if removal of impurities is not required. The pulverized glass output from screen classifier 202 then flows through pipe 204 to first air classifier 206. First air classifier 206 then classifies the pulverized glass into three groups. The first group is the pulverized glass less than 5 microns in size. This glass is output through pipe 208. The second group is the pulverized glass between 5 and 15 microns. This glass is output through pipe 210. The third group is the pulverized glass larger than 15 microns. This glass is output through pipe 212 and passed to second air classifier 213. Second air classifier 213 then also classifies the glass into three groups. The first group is the glass less than 5 microns in size that managed to pass through to second classifier 213. This glass is output through pipe 208. The second group is the glass that is between 15 and 30 microns in size. This glass is output through pipe 214. Finally the glass that is larger than 30 microns in size is output as the third group through pipe 216 back to second feed hopper 126 as shown in FIG. 1A.

Once the first-stage pulverized glass that is greater than 30 microns in size has been sent to second feed hopper 126, the glass is then repulverized by second pulverizer 128 which provides second-stage pulverized glass through pipe 130 to dust collector 132. Dust collector 132 releases air pressure from the output of second pulverizer 128. Attached to dust collector 132 is a material transport system 134 that restabilizes the air pressure in the output of dust collector 132 and then drives the second-stage pulverized glass back through pipe 124 to screen classifier 202 as shown in FIG. 1B. This second-stage pulverized glass then repeats the processing at air classifiers 206 and 213 that was performed on the first-stage pulverized glass.

Finally, as shown in FIG. 1C, the less than 5 micron pulverized glass in pipe 208 is then passed to dust collector 302 which releases air pressure in pipe 208. Attached to dust collector 302 is a material transport system 304 that restabilizes the air pressure and then passes the glass to group of silos 306 via pipe 305. Similarly, the 5 to 15 micron glass in pipe 210 is passed to group of silos 308 and the 15 to 30 micron glass in pipe 214 is passed to group of silos 310. Each of the silos in groups 306, 308, and 310 may provide a silo for a particular type of glass in one of storage bins 102.

In an alternative embodiment, as shown in FIG. 2, solid raw glass material is sent to feed hopper 312 and pulverized by pulverizer 314. The first-stage pulverized particle material made by pulverizer 314 may be further reduced in size by a ball mill 316 before it is classified according to particle size by air classifier 320. Particles that need to be further reduced in size may be sent back to pulverizer 314 by return pipe 318. Particles that have the desired particle size are output to dust collector 322.

In a second alternative embodiment, a ball mill may be substituted in place of second pulverizer 128 to help further reduce the particle size of the pulverized material. Depending on the particle size of the pulverized material, the ball mill may be a more efficient method of reducing the pulverized material to a particle size less than 30 microns. In particular, pulverized material between about 50 and 100 microns in size is well suited for use with a ball mill to obtain fine particle materials having a particle size less than about 30 microns. In contrast, pulverized materials that are greater than 100 microns may be more efficiently reduced in size by a pulverizer.

Alternative classification sizes may be used, if necessary, to suit the particular application for which the pulverized material will be used.

System 100 may additionally include a soft-start regulator for producing controlled delivery of power to the pulverizers and a computer control system for controlling and synchronizing the operation of the other components of system 100.

Storage bins 102, conveyer 104, crusher 108, washer/dryer 110, conveyer 112, feed hoppers 114, 126, and 312, dust collectors 120, 132, and 302, material transport systems 122, 134, and 304, screen classifier 202, air classifiers 206, 213, and 320, groups of silos 306, 308, and 310, the soft-start regulators, and the computer control system used in system 100 may be any suitable components for use in the production of the particular fine particle material desired. Also, one or more of these components may be omitted from system 100 and additional components may be added to system 100, without departing from the spirit and scope of the invention.

For example, a glass tempering system could be incorporated into the flow of glass between storage bins 102 and groups of silos 306, 308, and 310 in system 100. By tempering the glass, added benefits can be realized in the product in which the fine particle glass is used. Alternatively, a tempering process could be implemented in one of the existing components of system 100 such as washer/dryer 110 or pulverizers 116 or 128.

Figure 3:
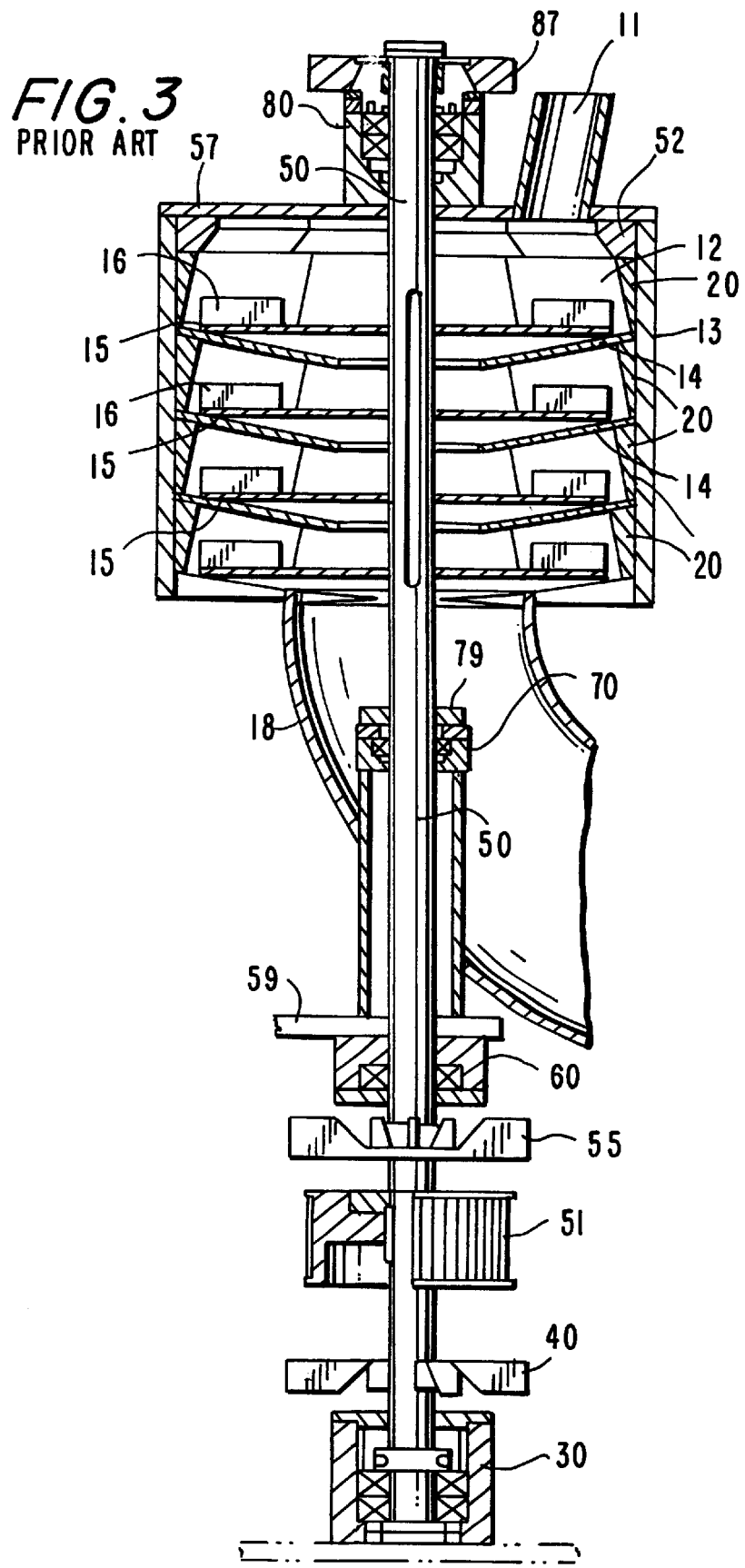
FIG. 3 illustrates a partially schematic and partially cut-away view of an embodiment of a pulverizer suitable for use in accordance with the present invention.

An example of a pulverizer suitable for use as pulverizers 116, 128, 314 in system 100 is described in Greco U.S. Pat. No. 5,820,044 (hereinafter "the '044 patent") issued Oct. 13, 1998, which is hereby incorporated by reference herein in its entirety. As explained in the '044 patent, and shown in FIG. 3, solid material to be pulverized enters an inlet 11 to a processing chamber 12 within container 13. Chamber 12 is divided into four compartments by baffle plates 14, and each compartment contains a rotor 15. Rotors 15 are fixed to shaft 50 for rapid rotation within processing chamber 12.

Each rotor 15 has peripheral vanes 16 that impel solid material radially outward against inside surfaces of rings 20 that are arranged around each impeller 15. Rings 20 preferably have multi-sided internal surfaces surrounding and confronting each respective impeller 15. Solid material flung radially outward by vanes 16 on rotors 15 impacts against the internal surfaces of rings 20 for breaking the solid material down into finer particles.

As the particles become smaller, they move downward through successive stages within processing chamber 12. The particles pass through spaces that are available between vanes 16 of impellers 15 and the inside surfaces of rings 20. The material then flows through central openings of successive baffle plates 14 to enter lower stages where it encounters successive impellers 15.

The pulverized material outlet from the lowermost stage below the lowermost impeller 15 proceeds downward through an output chute 18. The rotation of vanes 16 on impellers 15 pumps air through processing chamber 12 along with solid material, and this helps force pulverized particles through output chute 18, along with an air stream.

Considerable power is input to shaft 50 via pulley 51, for violently hurling solid material outward against rings 20. In a working prototype, for example, a 300 horsepower motor drives shaft 50 by a toothed belt (not shown) mating with teeth on pulley 51. The power expended in processing chamber 12 produces considerable heat. The shaft 50 lengthens about 3 mm from the heat generated during operation. The exact lengthening of shaft 50 will depend on materials used in construction, materials being processed, power input, and other variables; but however much shaft lengthening actually occurs must be accounted for.

Figure 4:
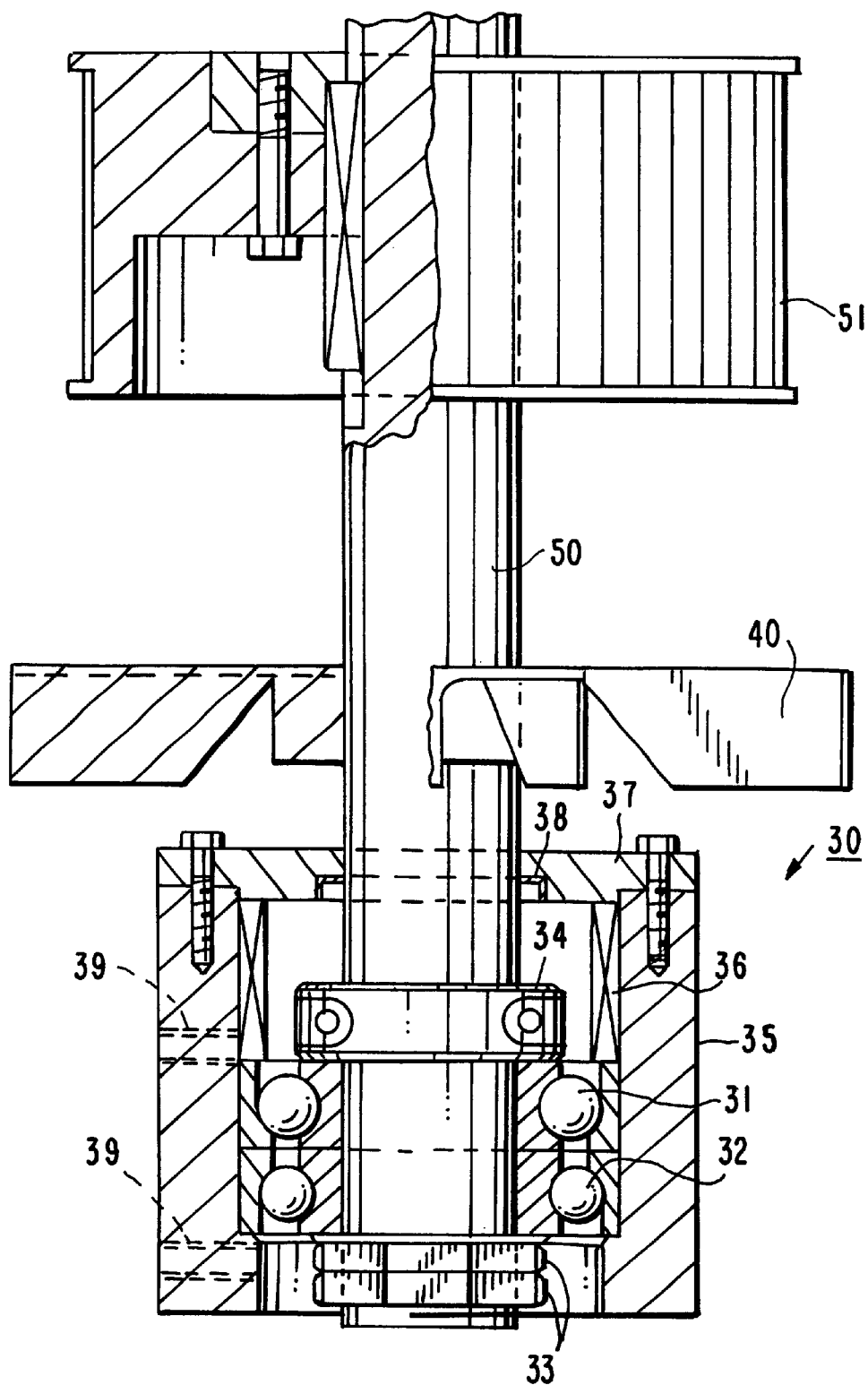
FIG. 4 illustrates an enlarged, partially schematic and partially cut-away view of one bearing assembly for the pulverizer of FIG. 3.

As shown in FIGS. 4–7, the shaft lengthening may be accommodated for by a floating bearing system. Turning to FIG. 4, beginning at the bottom, shaft 50 is supported by bottom bearing 30, as best shown in FIG. 4. A pair of ball bearings 31 and 32 are fitted to a lower region of shaft 50 between bottom collars 33 and a top collar 34. Ball bearings 31 and 32 are arranged in a housing 35 so that outer bearing races fit within the inside of housing 35 and inner bearing races fit on and rotate with shaft 50. A spacer 36 extends between an outer race of bearing 31 and a cover plate 37 that is secured to housing 35. Cover plate 37 contains a seal 38 bearing against shaft 50 to keep dirt out of the inside of housing 35. Bore holes 39 in housing 35 form passageways to admit lubricating grease and provide pressure relief overflow.

A fan 40 is secured to shaft 50 above bearing housing 35 to direct cooling air flow over housing 35 and cover plate 37, for removing heat from ball bearings 31 and 32 during operation. Above fan 40 is pulley 51, which is preferably keyed to shaft 50 for transmitting driving torque from a motor-driven belt (not shown). Shaft 50 has support bearings both above and below pulley 51.

Figure 5:
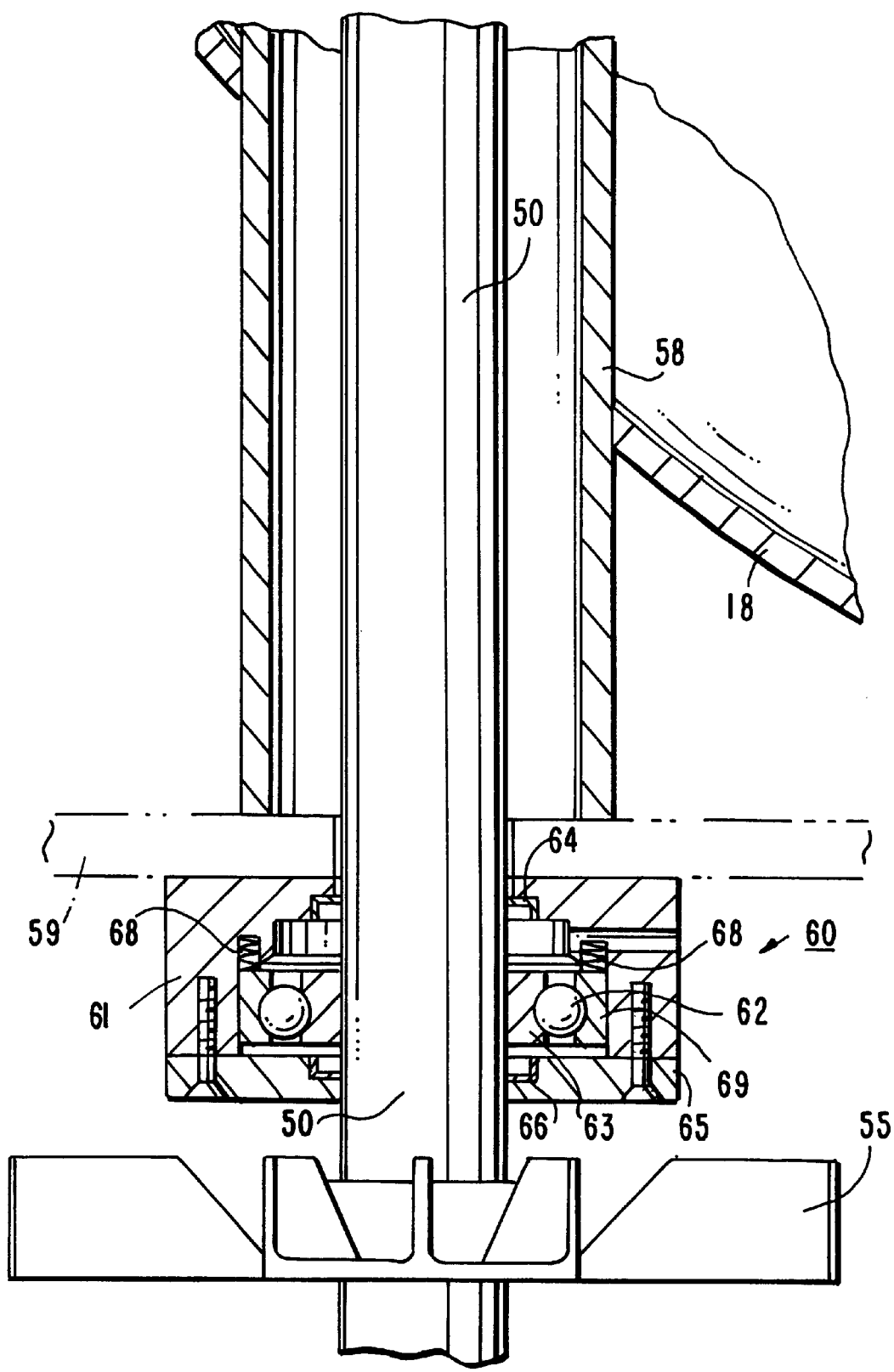
FIG. 5 illustrates an enlarged, partially schematic and partially cut-away view of another bearing assembly for the pulverizer of FIG. 3.

Above pulley 51 and below discharge chute 18 is a bearing 60 that is best shown in FIG. 5. A fixed support plate 59 holds a bearing mount housing 61 in a fixed position surrounding shaft 50. Within housing 61 is a ball bearing 62 having an inner race 63 fitted on and movable with shaft 50 and an outer race 69 that has a sliding fit allowing vertical movement within mount 61. A seal 64 is arranged between housing 61 and shaft 50, and another seal 66 is arranged between cover plate 65 and shaft 50. Seals 64 and 66 help keep dirt from entering mount 61.

Shaft 50 moves a small amount vertically from thermal expansion and contraction; and inner bearing race 63, while rotating with shaft 50, also moves axially with shaft 50 during thermal elongation. Outer bearing race 69 has a sliding fit within housing 61 that allows vertical movement of outer race 69, even at elevated temperatures. An array of compression springs 68 arranged within mount 61 presses downward on outer race 69 to resist upward movement and prevent rotation of outer race 69. Six compression springs equally spaced apart in a ring around shaft 50 are adequate for this purpose, and other spring arrangements can also be used.

When shaft 50 elongates from thermal expansion and ball bearing 62 rises with shaft 50, outer race 69 compresses springs 68 and rises along with inner race 63 to keep ball bearing 62 in working alignment. When shaft 50 later cools and contracts, lowering ball bearing 62, springs 68 extend somewhat and push outer race 69 downward in alignment with inner race 63. A reasonably light pressure from springs 68 is adequate to prevent outer race 69 from rotating and keep outer race 69 in vertical alignment with inner race 63.

A fan 55 fixed to shaft 50 below bearing 60 directs cooling air over bearing 60 to remove heat from ball bearing 62. Fan 55 works in an opposite direction from fan 40.

Figure 6:
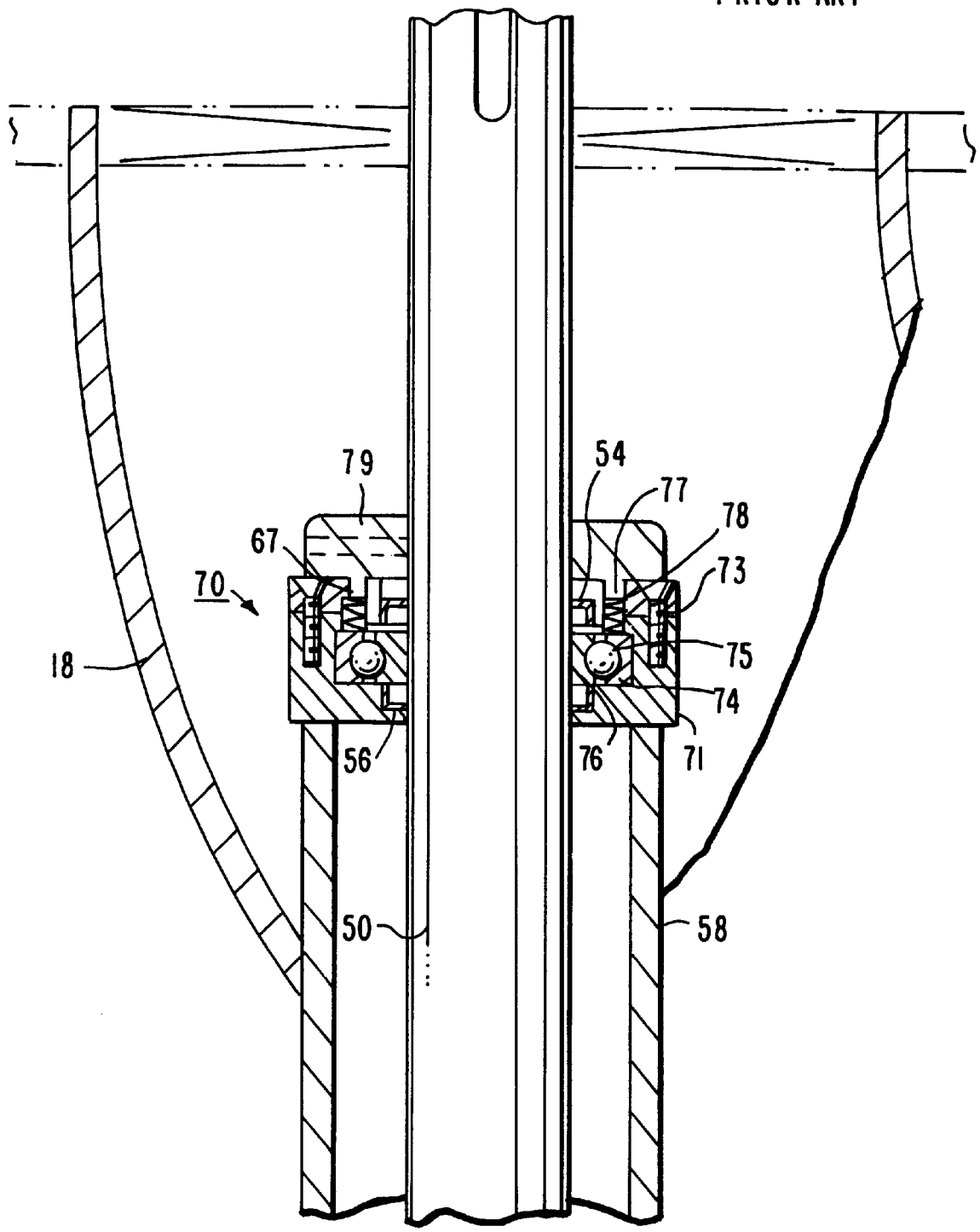
FIG. 6 illustrates an enlarged, partially schematic and partially cut-away view of yet another bearing assembly for the pulverizer of FIG. 3.

The plate 59 that supports bearing 60 also supports a pipe 58 that extends upward around shaft 50 into discharge passageway 18. At the top of pipe 58 is a bearing assembly 70 holding another ball bearing 75 for supporting shaft 50, as shown in FIG. 6. A lower shaft seal 56 is arranged between a mount housing 71 and shaft 50, and an upper shaft seal 54 is arranged between a mount cover plate 73 and shaft 50. An array of compression springs 78 retained in cover plate 73 presses down against an outer race 74 of ball bearing 75. As previously described for bearing 60, springs 78 allow outer bearing race 74 to rise with inner bearing race 76 when shaft 50 elongates thermally. This is possible because outer race 74 has a sliding fit within mount housing 71 against the resistance of springs 78.

The arrangement of bearing 75 and bearing mount 71 within discharge passageway 18 subjects bearing 75 to the risk of pulverized material in chute 18 entering housing 71. To reduce this risk, plate 79 is fixed on shaft 50 above cover plate 73 for mount 71. Plate 79 spins with shaft 50 and thereby throws pulverized material radially outward to divert such material away from bearing housing 71. This helps keep ball bearing 75 clean.

Plate 79, being fixed to shaft 50, rises with shaft 50 when thermal elongation occurs. Rising of plate 79 opens a gap between the underside of plate 79 and the top of housing cover 73. To inhibit entry of pulverized material into such a gap, plate 79 has a ring 77 extending downward into a corresponding groove 67 formed in cover plate 73. Ring 77 and groove 67 are concentric with shaft 50 so that ring 77 spins within groove 67 and provides a material barrier across a gap between cover plate 73 and the underside of plate 79. These measures, in conjunction with shaft seals 71 and 72, assure that bearing 75 remains clean. Many different configurations of rings and grooves can be used for such a purpose.

Figure 7:
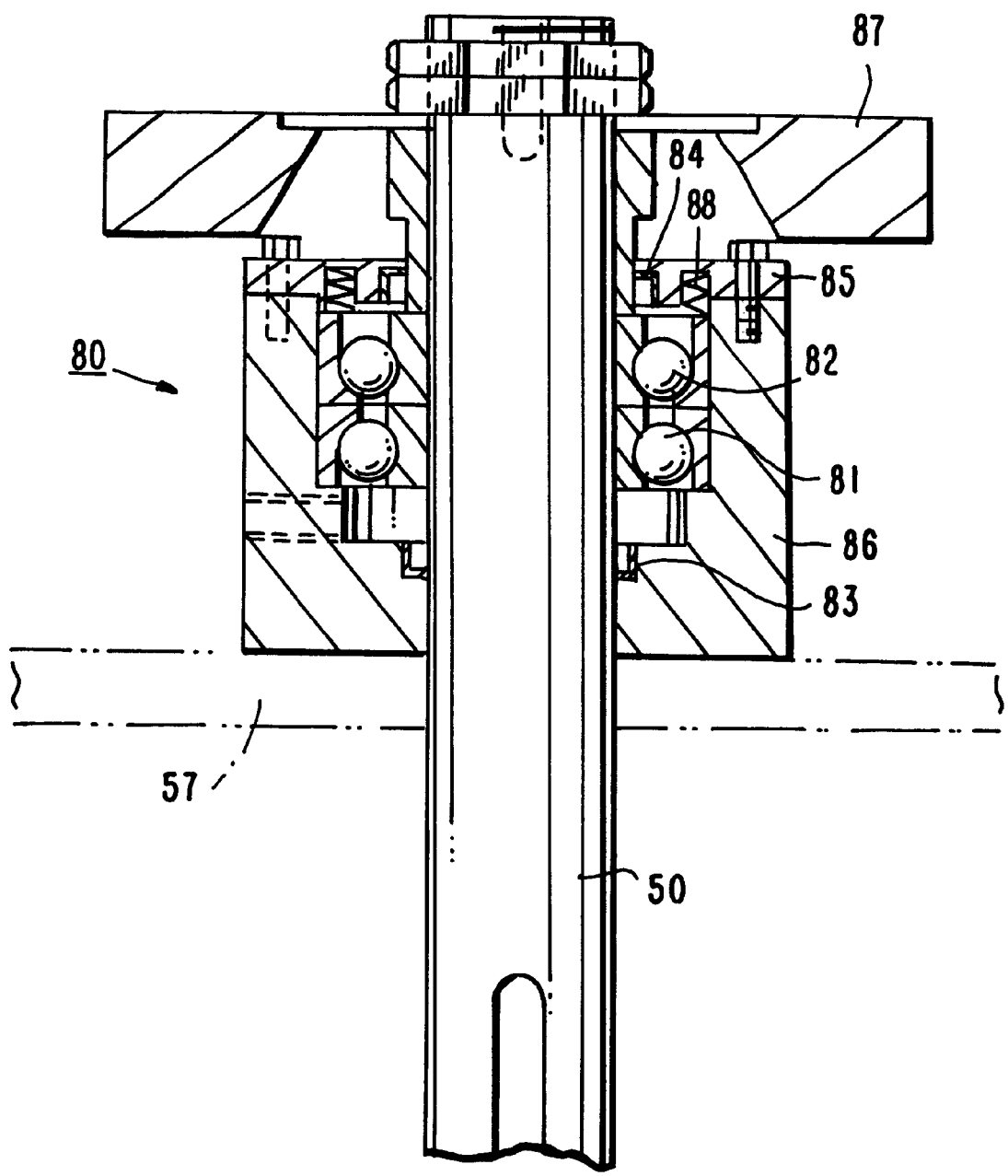
FIG. 7 illustrates an enlarged, partially schematic and partially cut-away view of still another bearing assembly for the pulverizer of FIG. 3.

An upper bearing assembly 80 is arranged on a support plate 57 above processing chamber 12 at an upper region of shaft 50, as best shown in FIG. 7. Mount housing 86 of assembly 80 contains a pair of ball bearings 81 and 82, each having a sliding vertical fit within housing 86. An array of compression springs 88 presses downward on the outer race of bearing 82 so that both bearings 81 and 82 can rise with thermal elongation of shaft 50 against the pressure of springs 8. Shaft seals 83 and 84 are arranged respectively in count housing 86 and in housing cover plate 85. A fan 87 arranged above cover plate 85 directs cooling air over housing 86 for cooling bearings 81 and 82.

The bearing assemblies 60, 70, and 80, arranged above fixed lower bearing 30, all have housing and spring arrangements that allow outer bearing races to rise with thermal elongation of shaft 50. This ensures that all bearings run in alignment and give proper support to shaft 50 under operating conditions. Without such provisions for axial movement of bearings with shaft 50, bearings are destroyed as heat is generated from the work done in processing chamber 12. Many different spring arrangements and configurations of bearings and mount housings are possible, providing the bearings are given freedom of vertical movement.

Figure 8:
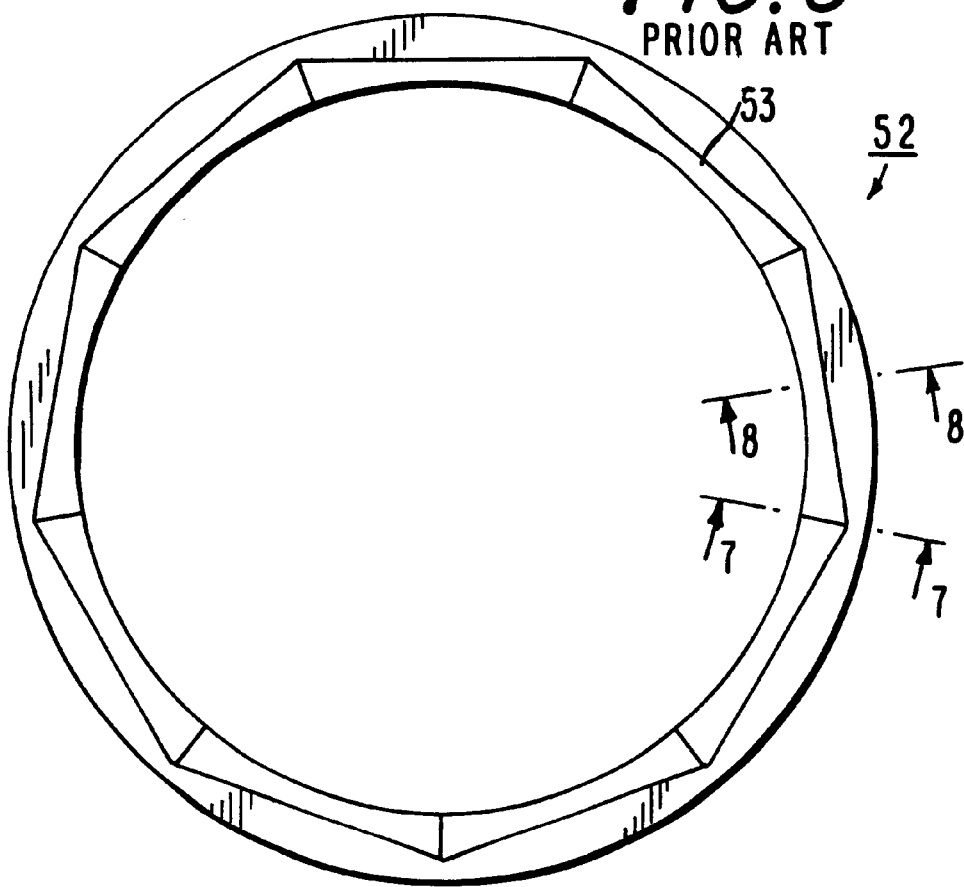
FIG. 8 illustrates a plan view of a preferred embodiment of a top ring for the pulverizer of FIG. 3.
Figure 9:
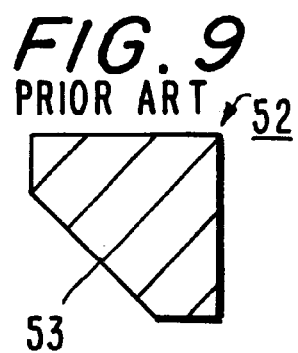
FIG. 9 illustrates a cross-sectional view of the ring of FIG. 8, taken along the line 7—7 thereof.
Figure 10:
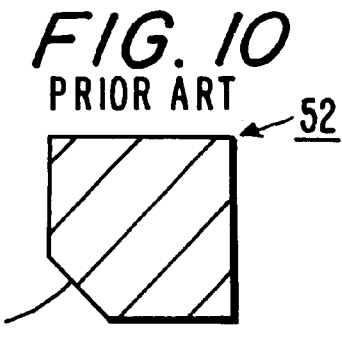
FIG. 10 illustrates a cross-sectional view of the ring of FIG. 8, taken along the line 8—8 thereof.

Within processing chamber 12, the throughflow of material being pulverized has been improved and the aggressiveness of the pulverizing action has been enhanced by several improvements. At an upper region of processing chamber 12 is arranged a ring 52 that has a multi-sided inside surface 53 that is beveled to face downward toward uppermost impeller 15, as best shown in FIGS. 8–10. Downwardly beveled faces 53 are wider at corners where faces meet, as shown in FIG. 9, and are narrower in central face regions, as shown in FIG. 10. Ring 52 directs material downward into contact with vanes 16 on uppermost impeller 15 so that any material bouncing upward into contact with ring 52 is deflected back downward to encounter pulverizing force.

Figure 11:
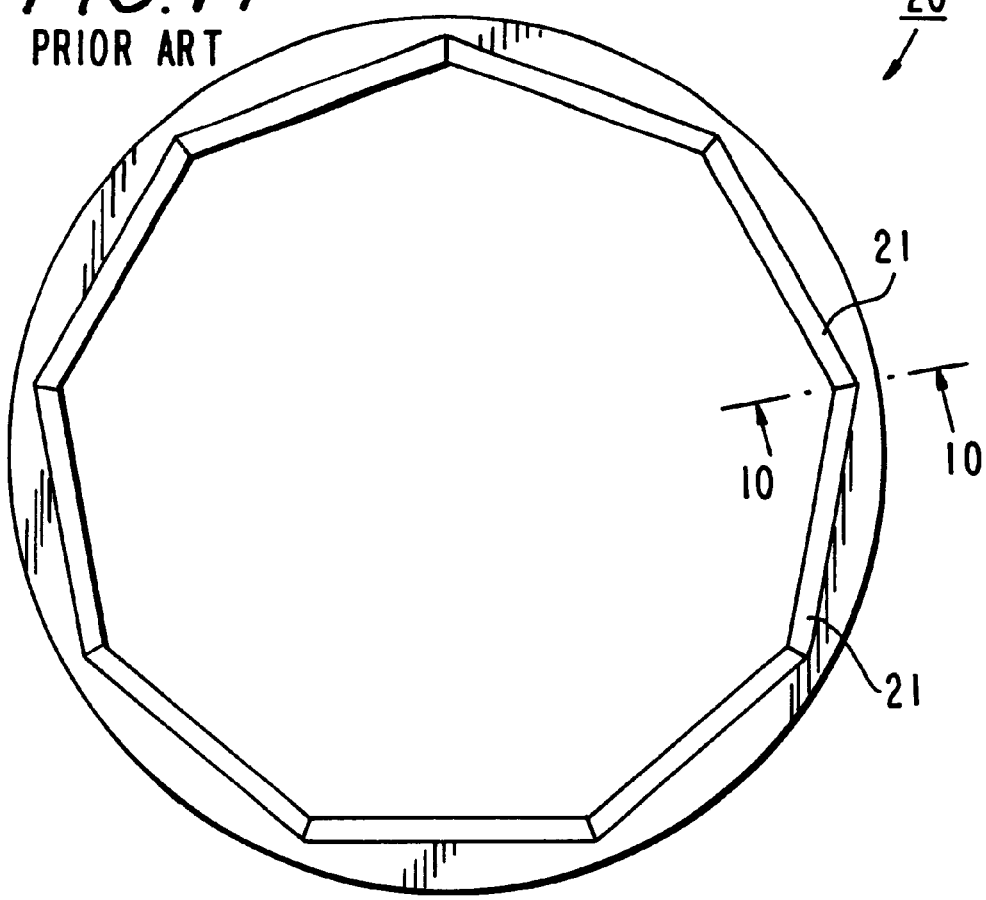
FIG. 11 illustrates a partially schematic plan view of a preferred embodiment of an impact ring of the pulverizer of FIG. 3.
Figure 12:
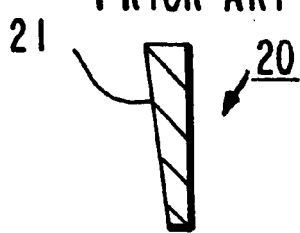
FIG. 12 illustrates a cross section of the ring of FIG. 11, taken along the line 10—10 thereof.
Figure 13:
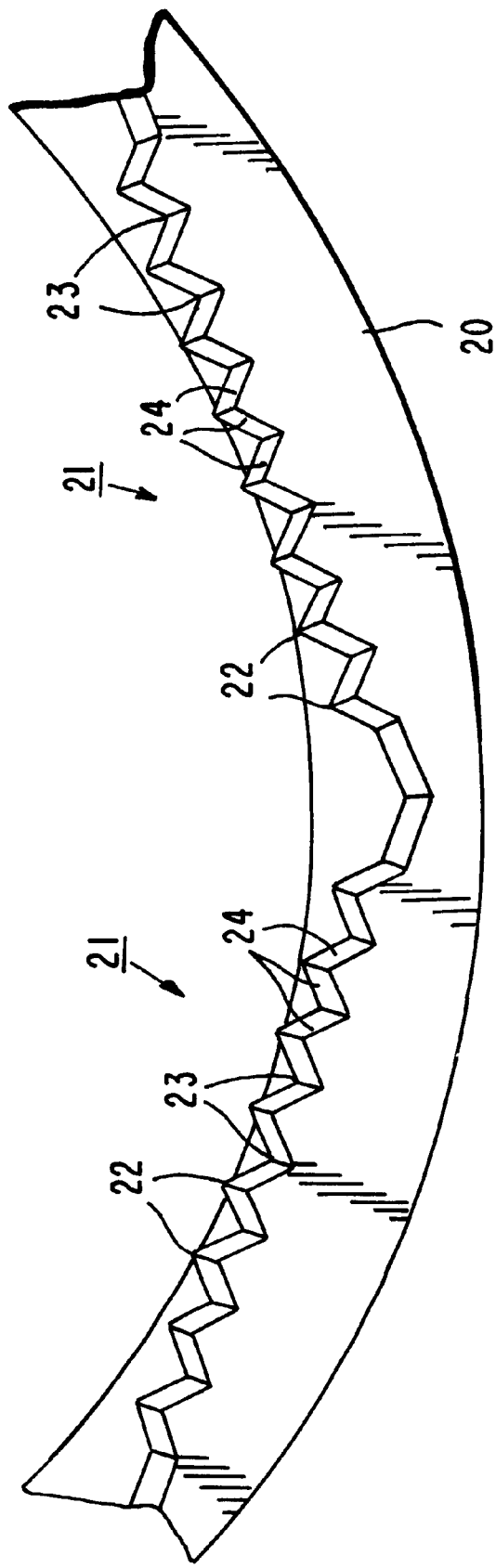
FIG. 13 illustrates an enlarged fragment of the ring of FIG. 11 showing a preferred ridged and grooved inner surface.

Rings 20 that surround impellers 15 are also improved, as shown in FIGS. 11–13. Rings 20 can have different numbers of inward facing surfaces 21, and these are preferably inclined inward from bottom to top, as shown in FIG. 10. A 10 degree inclination for ring surfaces 21 is preferred, but other angles of inclination may also work. The inward slope of surfaces 21 makes their upper regions extend further into processing chamber 12 than their lower regions, which tends to deflect material downward into impellers 15 and vanes 16. The inward inclination of surfaces 21 of a succession of rings 20 enhances the throughflow of material being pulverized and also helps direct pulverizable material into contact with vanes 16 of impellers 15.

Inward facing surfaces 21 of rings 20 are also preferably provided with ridges and grooves, as shown in FIG. 13. Preferably evenly spaced ridges 22 separated by grooves 23 provide a jagged or zigzag contour for surfaces 21 for scattering material impacting on surfaces 21. Sloping sides 24 of ridges 23 deflect impacting material in various directions, depending on angle of incidence. Sloping ridge sides 24 can also lead to double impacts of material glancing off of one ridge side and impacting against another. The result is to deflect or rebound material in different directions, adding randomness to the pulverizing process and making pulverization more aggressive.

Figure 14A:
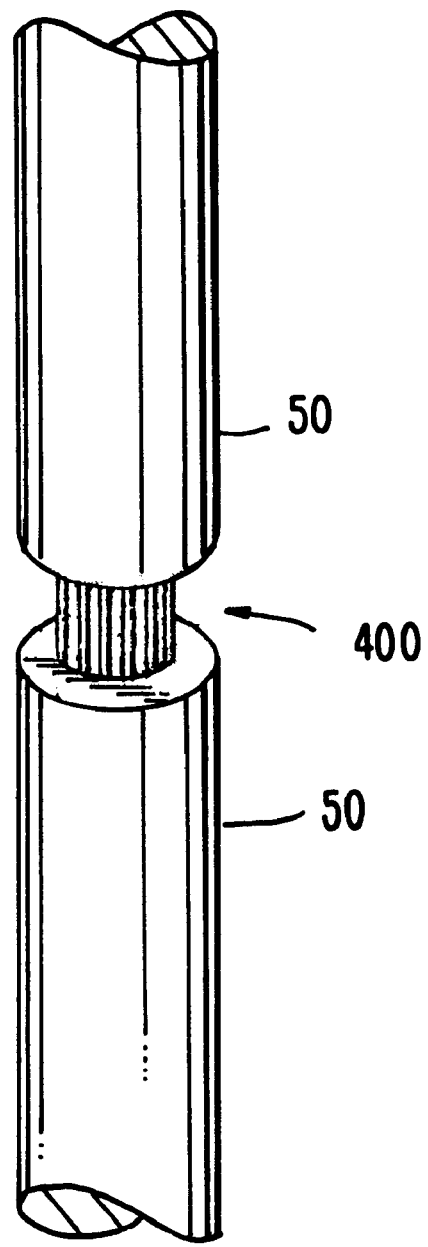
FIGS. 14A–B illustrate alternate shafts that are split into two or more portions and connected by torque transferring couplings for the pulverizer of FIG. 3.
Figure 14B:
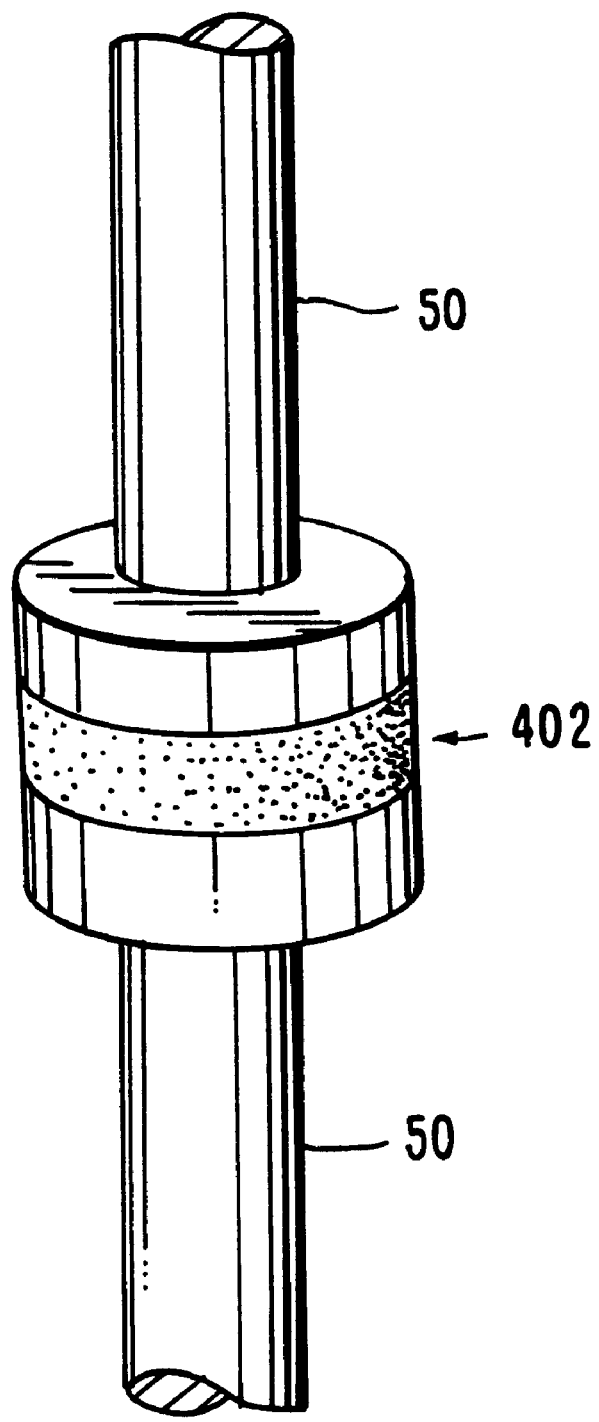

In preferred embodiments of the present invention, modifications to the pulverizer described in the '044 patent and herein in connection with FIGS. 3–13 may be implemented as part of pulverizers 116 and 128. For example, rather than using a shaft that is mounted on floating bearings (as shown in FIGS. 3–7), the present invention may also be implemented with a shaft that has a coupling between portions of the shaft between one or more stationary bearings or that is cooled to prevent expansion. More particularly for example, as shown in FIGS. 14A and 14B, shaft 50 of the pulverizer of the '044 patent and FIGS. 3–13 may be split into two or more portions and connected by a torque transferring coupling 400 or 402. As illustrated, coupling 400 is a spline shaft that connects the two halves of shaft 50 and coupling 402 is a compressible coupling that connects the two halves of shaft 50, however, any suitable type of coupling 400 could be used. As illustrated in FIG. 15, shaft 50 of the pulverizer of the '044 patent and FIGS. 3–13 could additionally or alternatively be cooled to prevent expansion. The approach shown uses a cooling liquid 508 that is pumped through shaft 50 to keep it from expanding. Cooling liquid 508 may be stored in a reservoir 506, then pumped by a pump 502 through a rotary coupler 510 into rotating shaft 50 back out another rotary coupler 510 into a radiator or heat exchanger 504 and back into reservoir 506.

Figure 16:
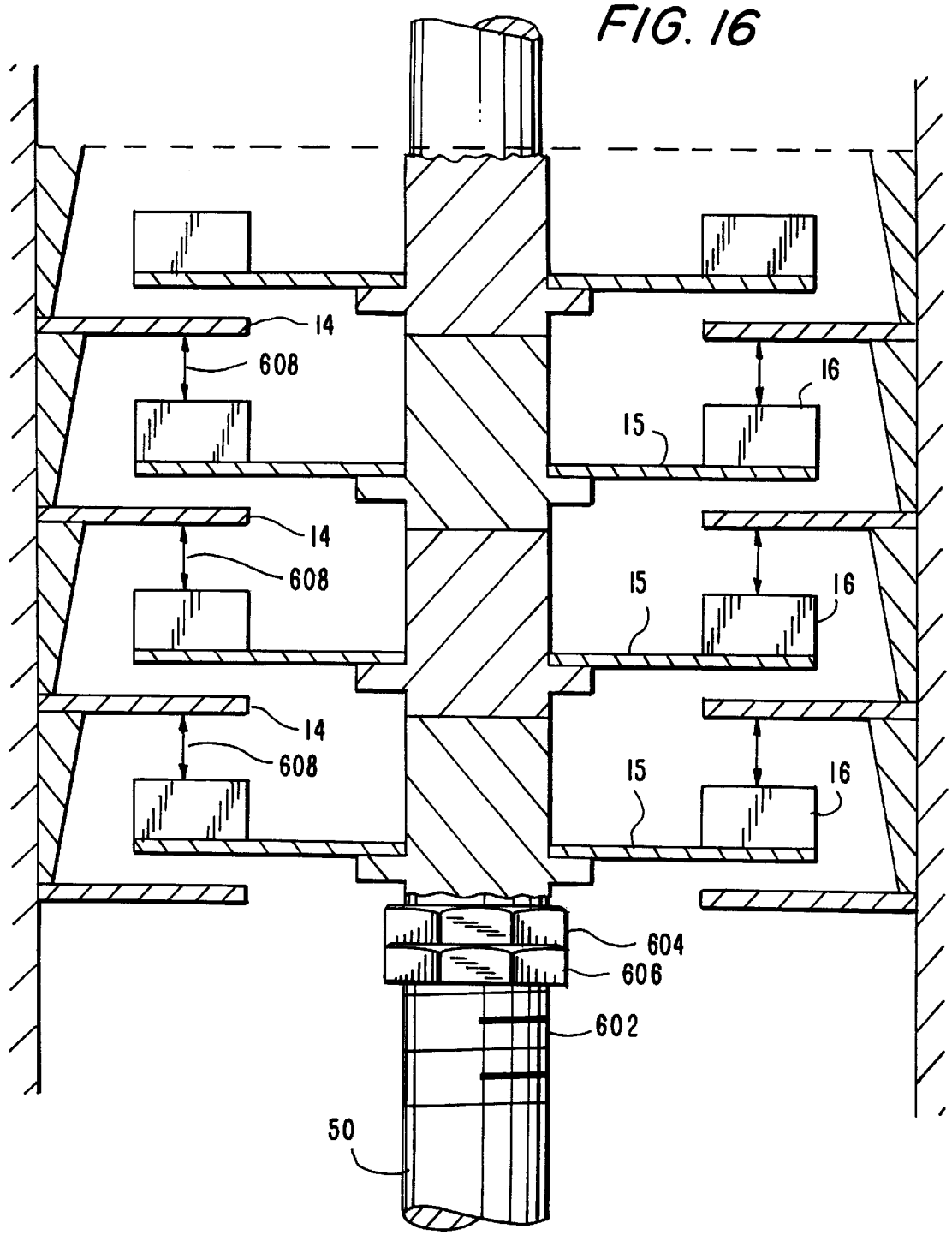
FIG. 16 illustrates yet another shaft for the pulverizer of FIG. 3 that includes a threaded section enabling a user to adjust the gaps between the vanes of impellers and baffles plates.
Figure 17:
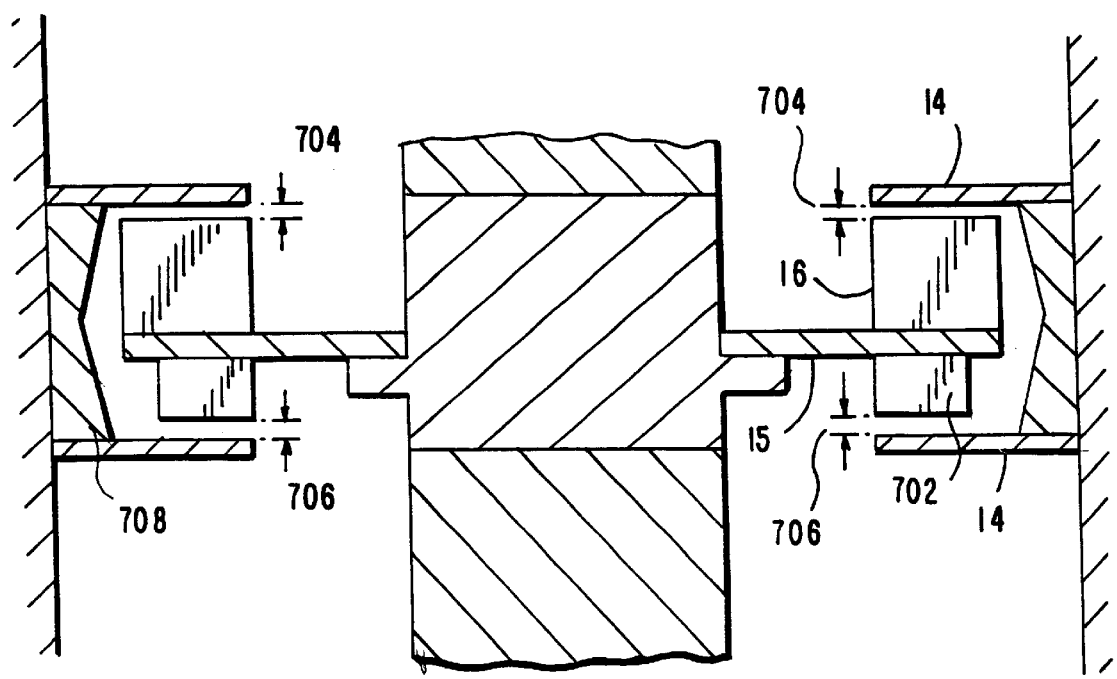
FIG. 17 illustrates an alternative embodiment of the pulverizer of FIG. 3 incorporating additional vanes along the bottom of one or more of the impellers.
Figure 18A:
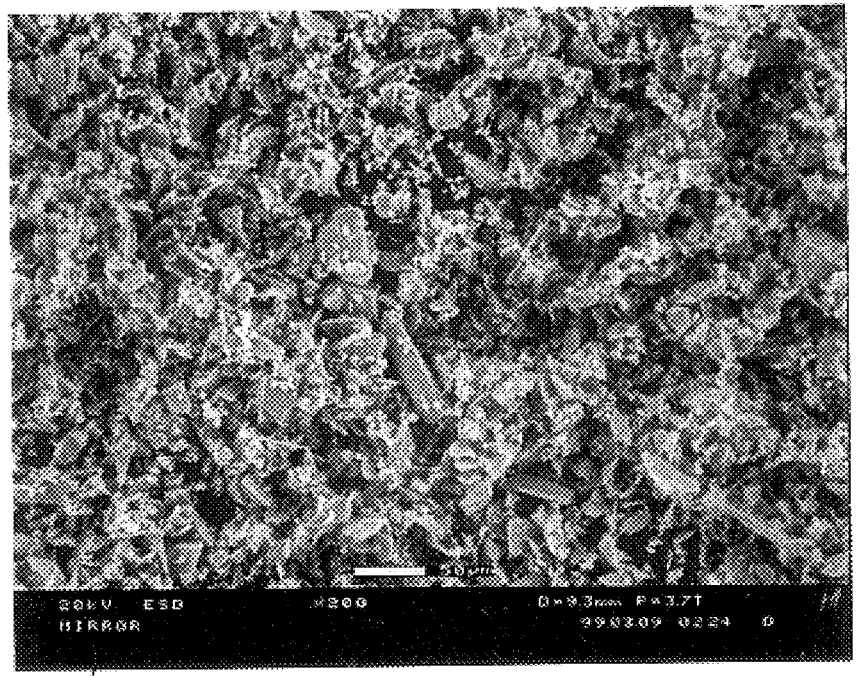
FIGS. 18A–D show scanning-electron-microscope micrographs of mirrorized glass chips produced in accordance with the present invention.
Figure 18B:
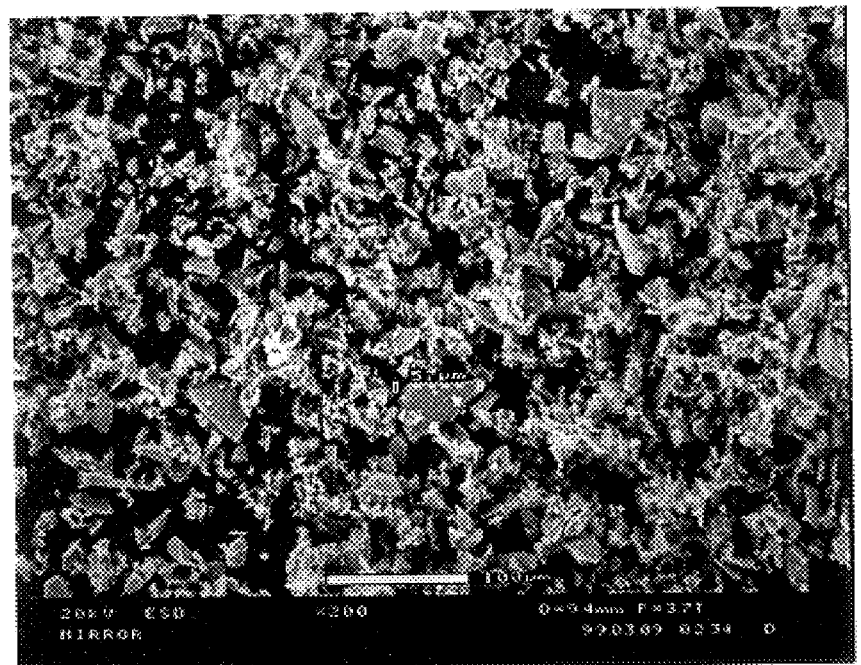
Figure 18C:
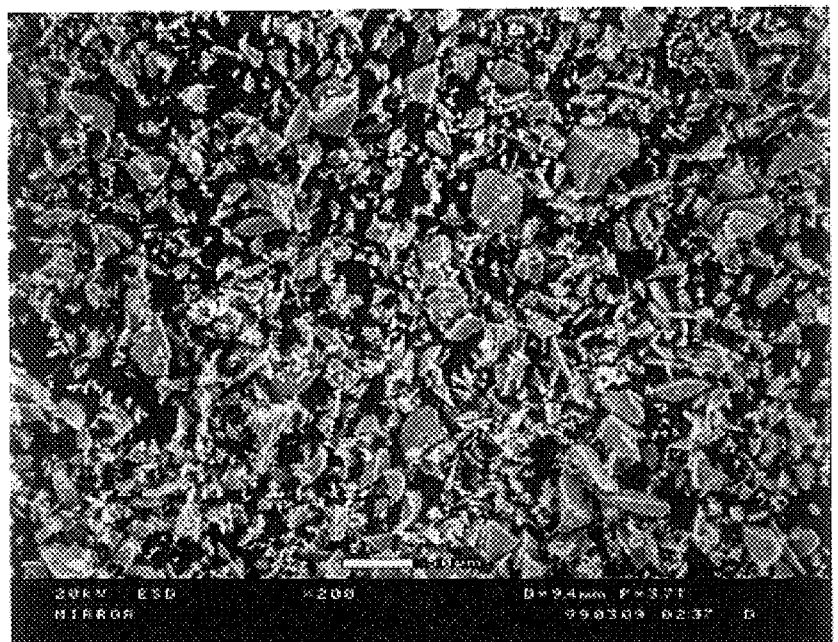
Figure 18D:
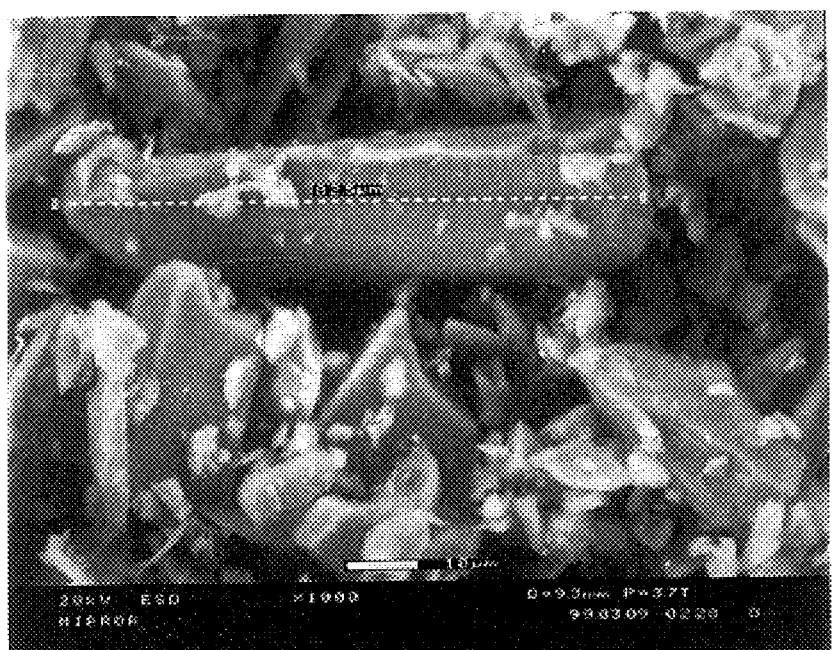

Other examples of modifications that could be made to the pulverizer of the '044 patent and FIGS. 3–13 are shown in FIGS. 16 and 17. As illustrated in FIG. 16, shaft 50 of the pulverizer could include a threaded section 602 and a pair of nuts 604 and 606 that enable a user to adjust the gaps 608 between vanes 16 of impellers 15 and baffles plates 14. Gaps 608 are adjusted by turning nut 604 to adjust the height of impeller 15 resting thereon. Once the height is set, nut 606 is made snug against nut 604 to lock in the setting. Because the remaining impellers 15 rest on the bottom impeller (and thus axially slide on shaft 50 while remaining rotationally fixed with respect to shaft 50), adjusting nut 604 causes all of the gaps 608 to be adjusted. By properly tuning gaps 608, the pulverizer can be made to operate most efficiently. he preferred gap spacing is about 0.062 inches for waste glass, although other gap spacings may be used with glass or other types of materials.

Turning to FIG. 17, still another modification to the pulverizer of the '044 patent and FIGS. 3–13 is shown. As can be seen, this modification includes incorporating additional vanes 702 along the bottom of one or more of impellers 15. Preferably, vanes 702 are only used on the bottom of the lowest impeller 15 in the pulverizer and vanes 702 are smaller than vanes 16. Vanes 702 provide a restriction on the flow of the material being passed out of the pulverizer. This restriction then causes the material to become further pulverized. Preferably, fifteen vanes 16 and three vanes 702 are used on the bottom impeller 15, fifteen vanes 16 and no vanes 702 are used on the middle impellers 15, and eighteen vanes 16 and no vanes 702 are used on the top impeller 15. Furthermore, preferably, the spacing 704 and 706 between the vanes 16 and 702 and plates 14 are tuned identically to about 0.062 inches (e.g., using the mechanism shown in FIG. 16), although any suitable spacing or combination of spacings could alternatively be used.

Also shown in FIG. 17 are a variation of rings 20 of the pulverizer. Rather than being constructed with an inside radius that decreases from bottom to top (as can best be seen in FIG. 3), rings 708 shown in FIG. 17 decrease in radius symmetrically from the middle height of the rings toward both the bottom and the top of the rings. In this way, the rings can be flipped over during maintenance of the pulverizer in order to compensate for the wear that typically occurs at near the inside-top of the rings without rebuilding or replacing the rings.

In accordance with the present invention, fine particle materials, such as those produced using system 100 of FIGS. 1A–14 1C, may be used to provide pigment blends containing randomly geometrically shaped particles suitable for use with one or more coloring agents such as pigments, metal flakes, coated mica, holographic flakes, colored or coated microbeads, colored or coated glass chips and other similar coloring agents. Alternatively, the coloring agents may be present in a colored base coating or substrate over which a transparent paint or coating composition containing the pigment blends of this invention can be applied. Most preferably, the fine particle chips are made of glass.

While the pigment blend may contain coated fine glass particle chips that have an opaque, mirrorized, and/or reflectorized coating, the glass chip mixture preferably includes glass chips that are transparent to allow light transmission. The transparent glass chips may include colorless and/or colored glass chips.

If the fine glass particle chips are colored, they may be used either alone or in combination with other colored glass chips to provide coloration to the pigment blend. The colored glass chips may have the same color as the coloring agents included in the pigment blend to enrich and deepen the apparent color of the other included coloring agents. Alternatively, the fine colored glass particles may have a different color to create secondary colors when viewed in combination with one or more coloring agents.

Because the fine colored glass particles may themselves act as a coloring agent, they may be used to replace pigments that are traditionally added to pigment blends. Because the color in colored glass are fused into the glass, colored glass chips may be a good coloring agent because the color will not leach out with time or exposure to various external elements such as high temperature and weather. Different colored glass chips may be mixed together to form secondary colors when the colored glass chips are viewed in combination. Secondary colors created by mixing two different colored glasses may also be subsequently mixed with primary colors available in other types of colored glass and/or other coloring agents to create apparent tertiary colors. Other color combinations necessary to achieve the desired color through the use of colored glass and/or other coloring agents will be evident to those skilled in the art.

The fine glass particle materials may be formed from virgin or recycled glass. Recycled glass is preferred because of its very low cost and because it helps preserve the environment by conserving natural resources and by reducing the amount of waste that must ultimately be stored in landfills. Recycled glass may be readily obtained from a variety of sources, such as a local recycling center, and may include clear glass (e.g., from jars), green glass (e.g., from certain beer bottles), amber glass (e.g., from certain soda bottles and other beer bottles), and mirrored glass (e.g., from recycled automobiles, home and office construction waste, and architectural glass).

Because recycled glass often already contains additives such as coloration or coatings that make the material colored, opaque, reflective, mirrorized, etc., the cost to produce useful pigment blends from recycled glass is even more inexpensive than attempting to use virgin glass to which coloration and/or coating must often be added.

The fine particle chips preferably are under 100 $\mu$m in the largest dimension. Because paint and coatings on substrates commonly are less than about 70 $\mu$m thick, the largest dimension of the chips must typically be less than 70 $\mu$m so that the paint or coating containing the chips appears and feels smooth on the substrate. However, because individual layers of the paint or coating on a substrate may be as thin as 20–30 $\mu$m, the chips preferably are smaller than 30 $\mu$m in the largest dimension. Particle sizes larger than 30 $\mu$m may be tolerated, however, if the particle. lies flat in the paint or coating composition such that the particle height extends not more than a few microns above the surface of the paint or coating on the substrate. Plastics, such as injection molded plastics and the like, may have surfaces that are rougher in texture, and consequently may include glass chips with larger particle size for visual and functional enhancing purposes without degrading or detracting from the apparent smoothness of the article. Preferably, the chips should be no larger than 40 $\mu$m in those circumstances.

Figure 19:
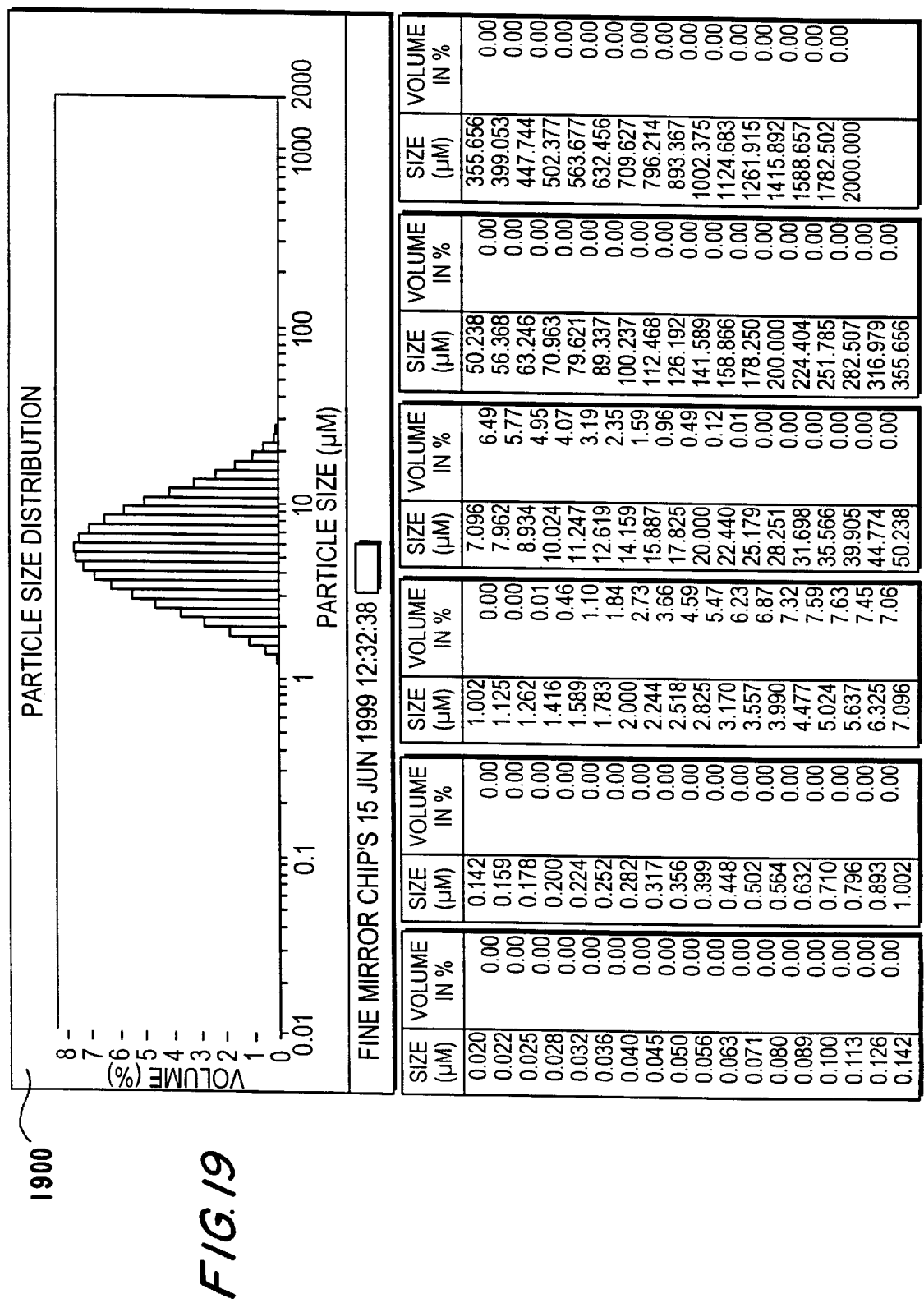
FIG. 19 shows a particle size distribution of fine particle glass produced in accordance with the present invention.

To ensure the paint or coating containing the fine particle chips appears and feels smooth on a substrate while preserving the enhanced visual effects that the chips provide, at least 95% of the chips most preferably are between 5 to 15 $\mu$m in the largest dimension. The chips will typically contain a distribution of particle sizes. The leading edge of the curve most preferably should not exceed 30 $\mu$m. The particle size may be determined by a Malvern MasterSizer 2000, or any other suitable particle size characterizer known to those skilled in the art. FIG. 19 illustrates a particle size distribution 1900 of particles made in accordance with the present invention and which are suitable for use in the pigment blend of the present invention. FIGS. 18A–18D show scanning-electron-microscope micrographs 1801–1804 of mirrorized glass chips produced in accordance with the present invention. FIGS. 18A–18D illustrate the randomly geometric shapes suitable for use in the present invention.

Although the chips may be formed in using system 100, it should be noted that the glass chips may also be formed by any other method, provided that method produces random shaped particles having the aforementioned characteristics.

The glass chips may be made from any variety of glass compositions including silica glass, quartz, soda lime glass, electroconductive glass, sol-gel glass, organically modified sol-gel glass etc. The glass is preferably inorganic, inert, and does not react with other components of the pigment blend. Although the glass chips may be non-tempered, they preferably are tempered to provide greater durability. Because tempered glass chips are tougher, they are more durable and are better able to preserve their geometric shape, which is important to obtaining enhanced visual effects from the glass chips.

The transparent glass chips preferably have an index of refraction between 1.5 to 2.5, more preferably between 1.9 to 2.1, or mixtures thereof. The transparent glass chips preferably transmit light in the ultraviolet (UV) spectrum (between 200 to 400 m), visible spectrum (between 400 to 800 m), infrared (IR) spectrum (between 800 $\mu$m to 10 $\mu$m), or combinations thereof. More preferably, the transparent glass chips transmit visible and IR light while inhibiting UV transmission. By limiting UV transmission, the chips can reduce the damaging effect that UV light may have on paint, a coating, and/or a substrate beneath the glass chips. Most preferably, the transparent glass chips transmits only visible light. For specific applications, the glass chips may also selectively transmit and/or inhibit one or more wavelengths in one or more of the aforementioned spectral regions.

The reflective fine particle chips may be optically opaque, mirrorized, or reflectorized, such that the reflective chips reflect or emit light from the surface of the chips into and through the transparent glass chips present, or against coloring agents. These reflective chips in combination with one or more coloring agents give added depth and intensity to the visual appearance and color of the composition or substrate containing the pigment blend of this invention. The pigment blends containing the reflectorized chips may contain suitable additives, known to those skilled in the art, to create a variety of colors.

Alternatively, the reflective chips may be luminescent, electroluminescent, or phosphorescent. Each of those properties may be obtained by coating the chips with conventional luminescent, electroluminescent, or phosphorescent compositions known to those skilled in the art. Where necessary, the coating may also be electroconductive.

The pigment blends containing the glass chips are suitable for use with multi-layer paint systems, such as those used on automobile. Automobile paint systems typically comprise a base color coating having a 20 to 24 micron thick film build and a 42 to 48 micron thick clear coat. Until now, pigment blends of the present invention could not be produced on a commercial scale and used without the difficulties of film protrusion or other undesirable appearance factors.

In another embodiment, pigment blends containing the glass chips may be used in a mono-layer coating (non-clear coat) for exterior and interior paint applications. The pigment blends of this invention add a very satiny appearance to the surface while also creating a scattered reflective and luminescent appearance.

In another embodiment, particulate solids, such as oyster shells, clam shells, rubber, rock minerals, coal, aluminum, etc., that have randomly geometric shapes and sizes, may also be used for visual enhancement purposes in pigment blends in accordance with the present invention.

The presence of particulate solids in pigment blends offers the added advantage of reducing the amount of volatile organic compounds that commonly are used in paint and coating compositions. In alternative embodiments, lighter density particles may be used to reduce settling problems that can arise with heavier density particles.

Paint or coating compositions containing pigment blends of the present invention may be applied by any suitable method known to those skilled in the art, including calendering, spraying, brush painting, or any other standard method of applying paint or coating compositions.

The pigment blends of the present invention may be used on a variety of substrates, including metal, ceramic, glass, asbestos, human skin, leather, vinyl, plastic, polyester, epoxies, fabrics, wood, rubber, etc., for visual and functional enhancement. For example, a clear coating for wood may be enhanced with a pigment blend containing colorless glass chips and/or colored glass chips. The glass chips can increase the visual dimensionality of the wood by enhancing the tone and expanding the apparent definition of the ticking or grain in the wood, while also providing functional enhancement such as improved color travel.

In addition, substrates containing the pigment blend of the present invention can show improved abrasion resistance, which may be particularly useful in items such as articles of clothing, including leather goods. Substrates containing pigment blends with the fine particle can also show improved light fastness if the chips contain suitable UV screening. The fine particle chips may also be used as a component of a pigment blend in cosmetics to provide enhanced visual and functional properties. For example, cosmetics containing the fine particle materials may be used to help provide UV screening for the skin, camouflage blemishes, cellulite, wrinkles, varicose veins or other skin imperfections, and enhance the visual effect of the coloring agents contained within the pigment blend of the cosmetics.

Surface visibility of articles may be improved with pigment blends containing mirrorized and/or reflectorized fine particle chips. In particular, pigment blends containing mirrorized glass chips provide superior reflectivity and visibility compared to blends containing metal flakes. Such pigment blends can improve safety while also providing an aesthetically pleasing appearance. Because mirrorized or reflectorized glass chips display scattered reflectivity, enhanced night and day time surface visibility can be achieved from both multi-angle light sources and light sources close to the viewing angle of an observer.

It will be understood that the foregoing is only illustrative of the principles of the invention, and that various modifications can be made by those skilled in the art without departing from the scope and spirit of the invention, which is limited only by the claims that follow.

What is claimed is:

1. A method of improving a visual appearance of a pigment blend, the method comprising adding to said pigment blend a plurality of glass chips having a substantially random geometrical shape and a particle size less than about 100 microns;

wherein said glass chips have a coating; and said coating is opaque, reflective, or electroconductive.

2. The method according to claim 1, further including a coloring agent, wherein said coloring agent is selected from the group consisting of glass chips, pigments, metal flakes, coated mica, holographic flakes, clam shells, oyster shells, and glass beads.

3. A method of improving a visual appearance of a substrate, the method comprising introducing to said substrate a pigment blend comprising a plurality of glass chips having a substantially random geometrical shape and a particle size less than about 100 microns;

wherein said glass chips have a coating; and said coating is opaque, reflective, or electroconductive.

4. The method according to claim 3, wherein said substrate is selected from the group consisting of metal, ceramic, glass, asbestos, human skin, leather, polymer, fabrics, wood, and rubber.

5. The method according to claim 1 or 3, wherein said particle size is less than about 30 micron.

6. The method according to claim 1 or 3, wherein said glass chips are colorless, colored, luminescent, or phosphorescent.

7. The method according to claim 6, wherein said luminescent glass chips are electroluminescent.

8. The method according to claim 1 or 3, wherein said glass chips have an index of refraction between 1.5 to 2.5.

9. The method according to claim 1 or 3, wherein said glass chips substantially inhibit transmission of light in the ultraviolet spectrum.

10. The method according to claim 9, wherein said glass chips substantially inhibit transmission of light in the infrared spectrum.

* * * * *

UNITED STATES PATENT AND TRADEMARK OFFICE
CERTIFICATE OF CORRECTION

PATENT NO. : 6,447,595 B1  
DATED : September 10, 2002  
INVENTOR(S) : Greco et al.

It is certified that error appears in the above-identified patent and that said Letters Patent is hereby corrected as shown below:

Column 7,  
Line 55, replace "8" by -- 88 --;  
Line 55, replace "count" by -- mount --;

Column 9,  
Line 12, replace "he" by -- The --;  
Line 47, replace "1A-141C" by -- 1A-1C --;

Column 10,  
Line 8, replace "are fused" by -- is fused --;

Column 11,  
Line 29, replace "400 m" by -- 400 nm --  
Line 30, replace "800 m" by -- 800 nm --;  
Line 30, replace "800 μm" by -- 800 nm --;  
Line 36, replace "transmits" by -- transmit --.

Signed and Sealed this

Twenty-fifth Day of February, 2003

JAMES E. ROGAN  
*Director of the United States Patent and Trademark Office*